(12) United States Patent
Svensson

(10) Patent No.: US 6,182,576 B1
(45) Date of Patent: Feb. 6, 2001

(54) MONORAIL SYSTEM

(76) Inventor: Einar Svensson, 19686 Sunshine Way, Bend, OR (US) 97702

( * ) Notice: Under 35 U.S.C. 154(b), the term of this patent shall be extended for 0 days.

(21) Appl. No.: 09/206,792

(22) Filed: Dec. 7, 1998

Related U.S. Application Data

(63) Continuation of application No. 08/646,198, filed on May 7, 1996, now Pat. No. 5,845,581.
(60) Provisional application No. 60/107,485, filed on Nov. 6, 1998, and provisional application No. 60/081,337, filed on Apr. 8, 1998.

(51) Int. Cl.[7] .................................................... B61B 5/00
(52) U.S. Cl. ..................... 104/120; 104/124; 104/243; 104/244; 104/118; 105/136; 105/147; 105/167; 105/172; 105/174
(58) Field of Search .................... 104/93, 118, 119, 104/120, 124, 125, 130.01, 130.07, 130.11, 242, 243, 244, 245, 247; 105/72.2, 172, 96, 96.1, 133, 136, 141, 144, 147, 145, 167, 215.1, 215.2, 28, 34.1, 199.4, 3, 174

(56) References Cited

U.S. PATENT DOCUMENTS

| | | |
|---|---|---|
| 1,600,767 | 9/1926 | Lockwood . |
| 2,670,994 | 3/1954 | Parrott . |

(List continued on next page.)

FOREIGN PATENT DOCUMENTS

| | | |
|---|---|---|
| 550219 | 12/1957 | (CA) . |
| 1004084 | 1/1977 | (CA) . |
| 318969 | 8/1930 | (GB) . |
| 1004952 | 9/1965 | (GB) . |
| 2209318 | 10/1989 | (GB) . |
| 54-140311 | 10/1979 | (JP) . |
| 4-62201 | 2/1992 | (JP) . |

OTHER PUBLICATIONS

Thyssen Henschel, "Magnetic Leviation Technology Super Speed Maglev System Transrapid," 1993, 15 pgs., Industrie AG Henschel.

*Primary Examiner*—Mark T. Le
(74) *Attorney, Agent, or Firm*—Banner & Witcoff, Ltd.

(57) ABSTRACT

A monorail system for passenger and light freight transportation provides a support structure with an essentially planar top surface and a stabilizer guide rail having a vertical web portion supporting a head portion. The head guides a vehicle along the top surface while conductors secured to the web portion transmit electrical current to the vehicle through a current collector secured to the vehicle. A portion of the stabilizer guide rail may be flexible providing a simple, inexpensive device for switching the vehicle between a plurality of tracks. The system operates equally well with a variety of vehicle propulsion and suspension systems including electro-mechanical, magnetic levitation or linear electric motors. In a preferred embodiment, the width of the support structure's top surface is approximately half the width of the vehicle, and the side of the web portion opposite the side having the conductor includes control conduits that transmit command signals to the vehicle through a communications connector secured to the vehicle.

17 Claims, 29 Drawing Sheets

U.S. PATENT DOCUMENTS

| | | |
|---|---|---|
| 2,853,956 | 9/1958 | Wenner-Gren et al. . |
| 3,010,411 | 11/1961 | Peras . |
| 3,017,838 * | 1/1962 | Bingham .............................. 104/124 |
| 3,095,828 | 7/1963 | Deller . |
| 3,123,191 | 3/1964 | Sprigings . |
| 3,198,139 | 8/1965 | Dark . |
| 3,376,830 * | 4/1968 | Bingham .............................. 105/133 |
| 3,397,014 | 8/1968 | Nigrelli . |
| 3,426,703 * | 2/1969 | Morris .............................. 104/124 |
| 3,673,966 | 7/1972 | Wilson . |
| 3,710,727 * | 1/1973 | Svensson .............................. 104/124 |
| 3,823,672 | 7/1974 | Fellows et al. . |
| 3,841,227 | 10/1974 | Fink . |
| 3,847,086 | 11/1974 | Steenbeck . |
| 3,847,088 | 11/1974 | Karch . |
| 3,851,594 | 12/1974 | Schwarzler et al. . |
| 3,861,320 | 1/1975 | Lichtenberg . |
| 3,874,299 | 4/1975 | Silva et al. . |
| 3,896,737 | 7/1975 | Miericke . |
| 3,964,398 | 6/1976 | Breitling . |
| 4,089,272 | 5/1978 | Schmitz . |
| 4,090,452 | 5/1978 | Segar . |
| 4,153,302 | 5/1979 | Bass et al. . |
| 4,158,468 | 6/1979 | Bass et al. . |
| 4,181,080 | 1/1980 | Miller . |
| 4,194,603 | 3/1980 | Ross, Jr. . |
| 4,232,611 * | 11/1980 | Uozumi .............................. 105/215.1 |
| 4,280,412 | 7/1981 | Mihirogi . |
| 4,447,680 | 5/1984 | Segar et al. . |
| 4,646,651 | 3/1987 | Yamamura et al. . |
| 4,671,185 * | 6/1987 | Anderson et al. .............. 104/130.07 |
| 4,882,999 | 11/1989 | Azukizawa et al. . |
| 4,996,928 | 3/1991 | Janssen et al. . |
| 5,213,046 | 5/1993 | Proise . |
| 5,215,015 | 6/1993 | Iida et al. . |
| 5,247,890 | 9/1993 | Mihirogi . |
| 5,345,878 * | 9/1994 | Jacob .................................. 105/136 |
| 5,386,782 | 2/1995 | Dinis et al. . |
| 5,445,080 | 8/1995 | Austin . |
| 5,651,318 | 7/1997 | O'Donohue . |
| 5,845,581 * | 12/1998 | Svensson .............................. 104/120 |

\* cited by examiner

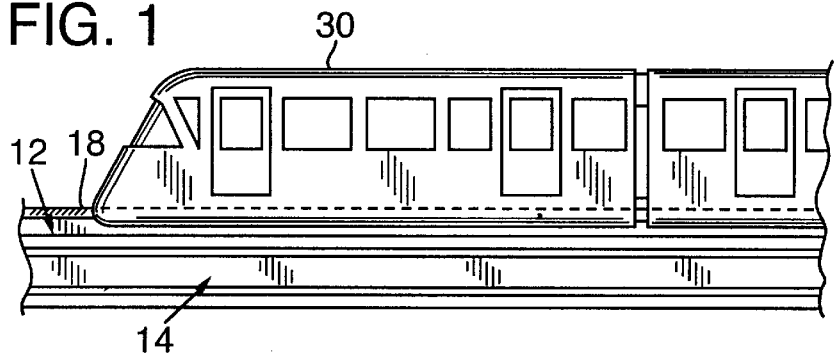
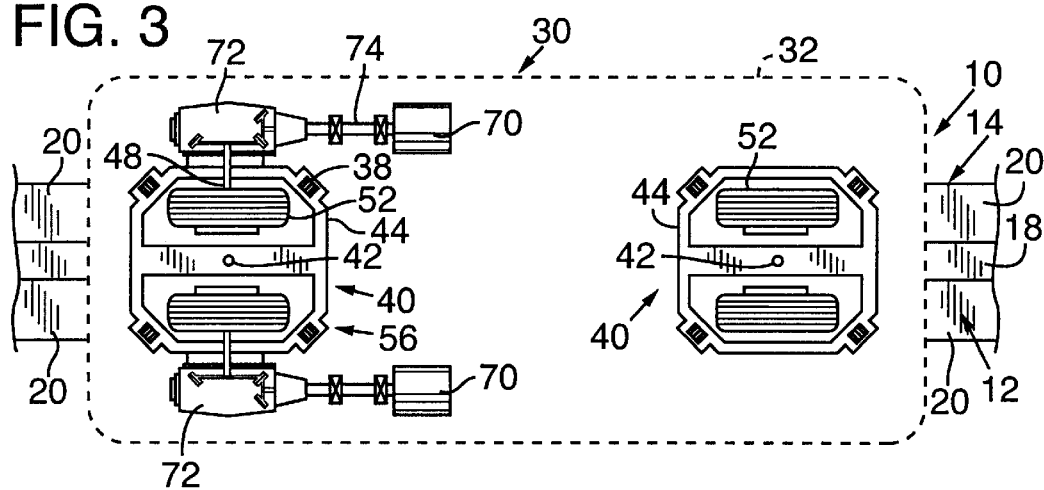
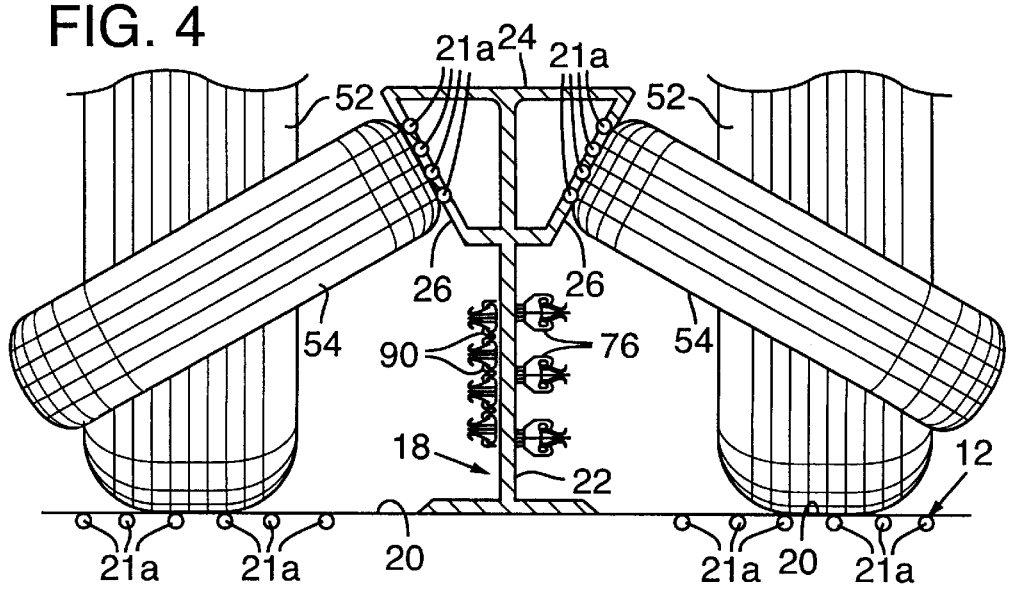

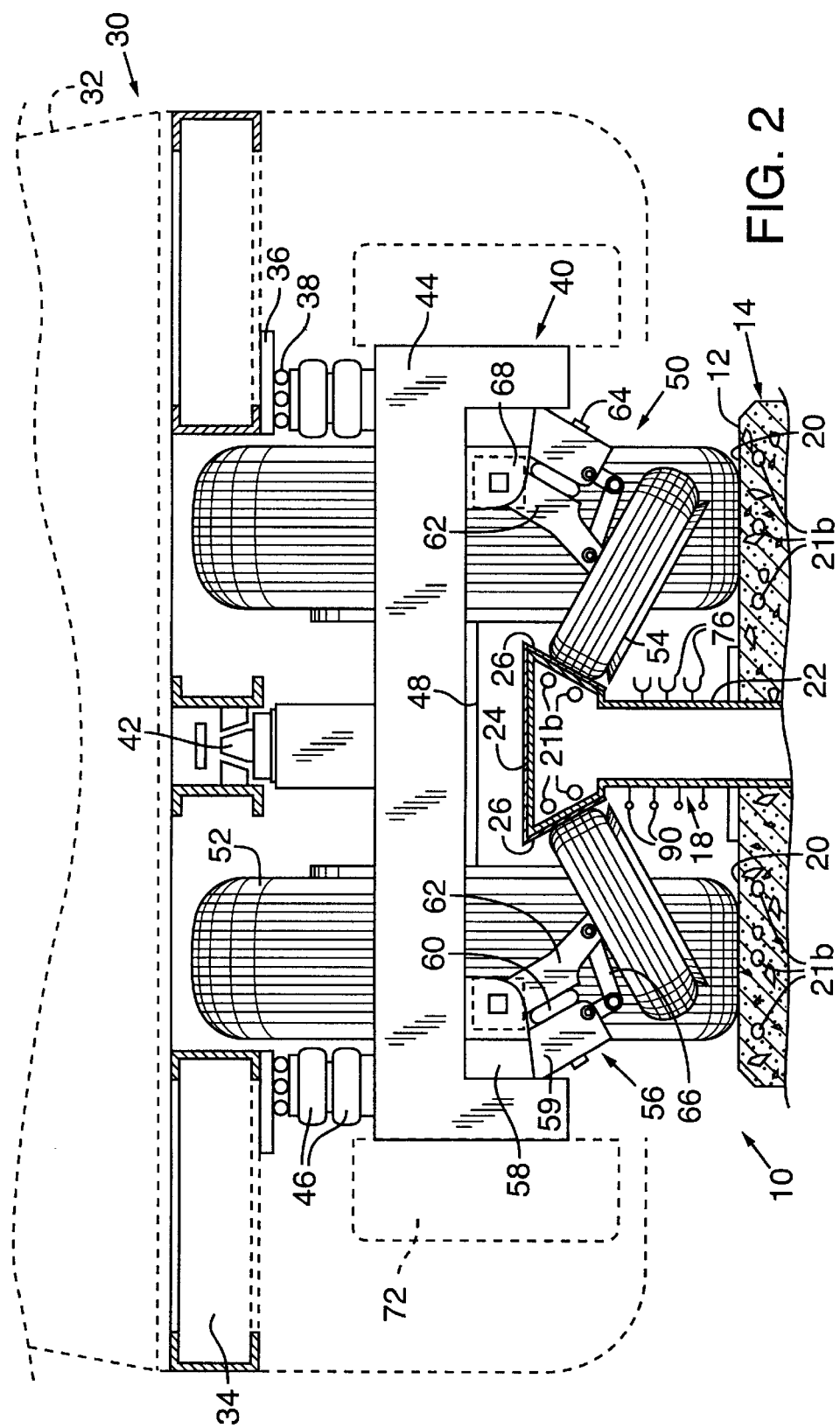

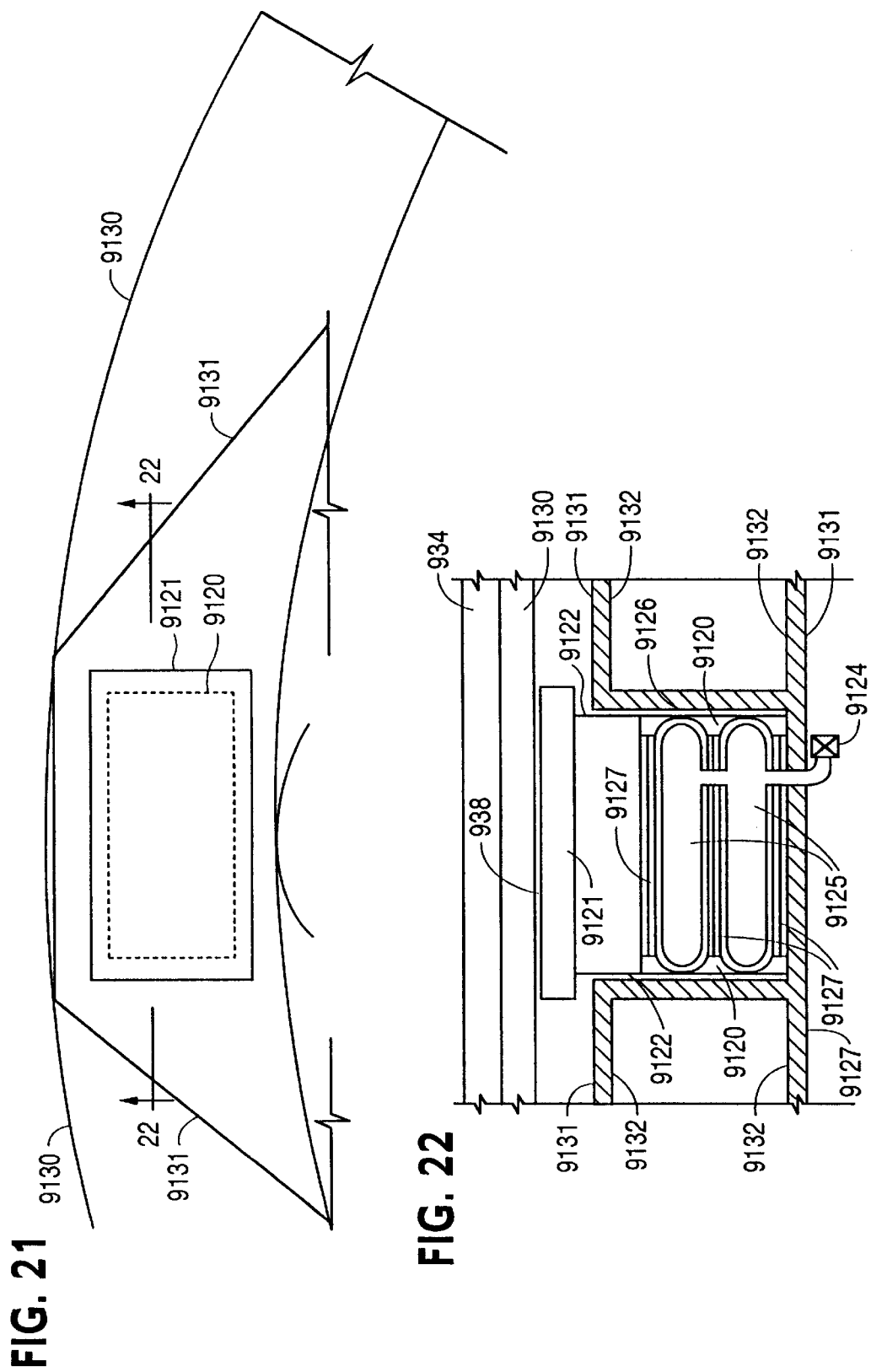

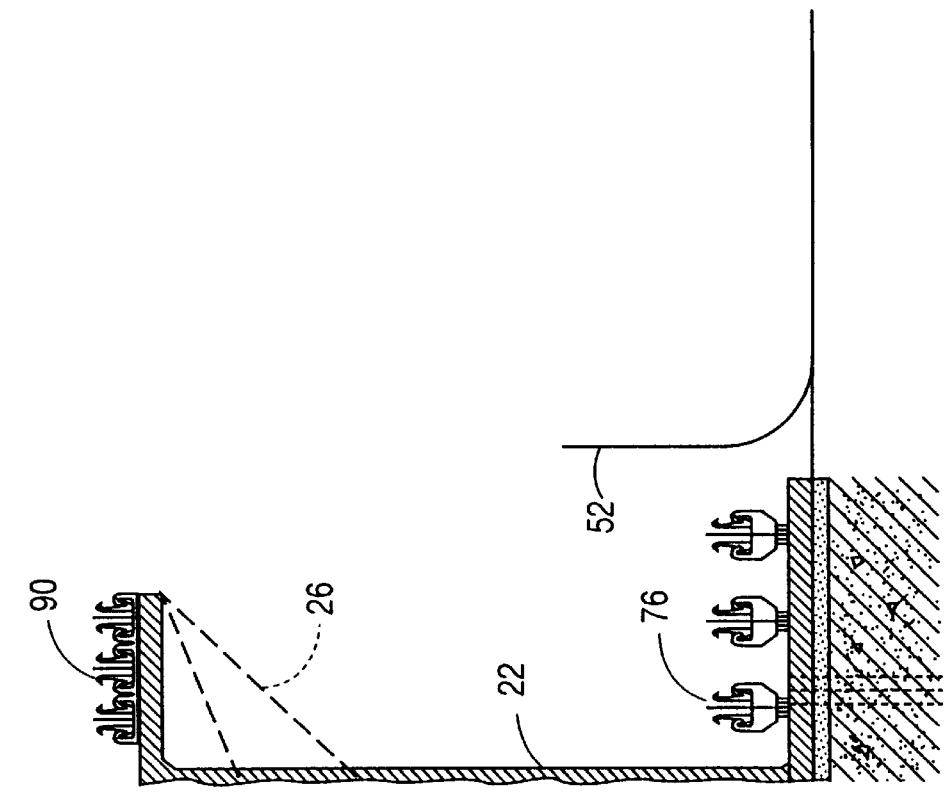
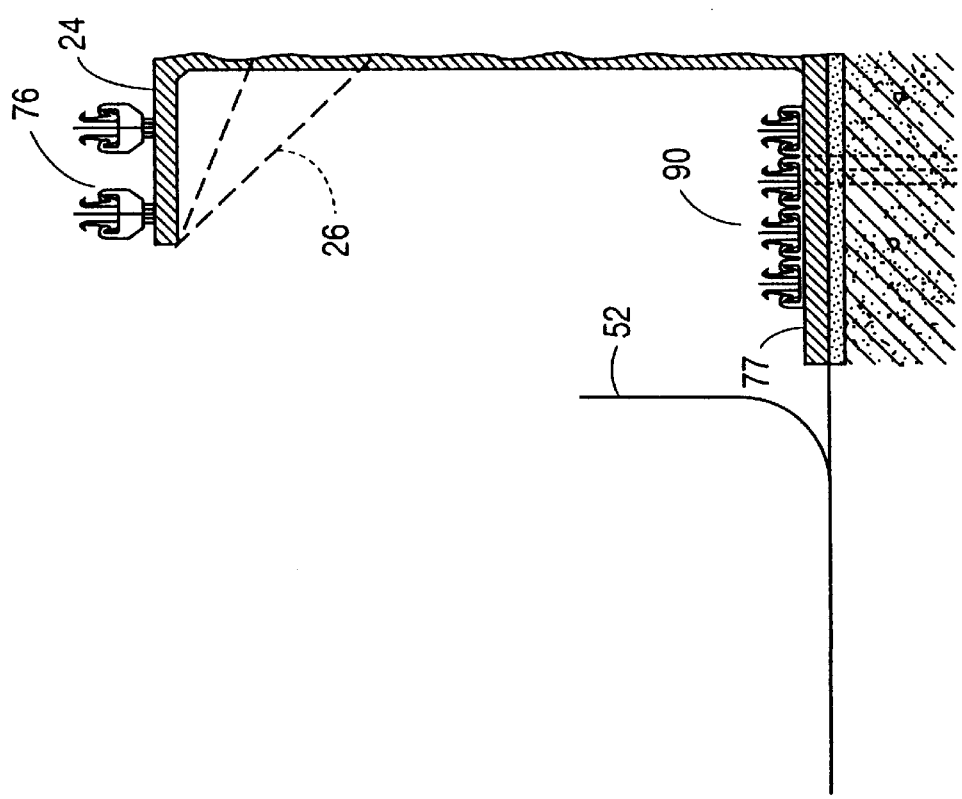

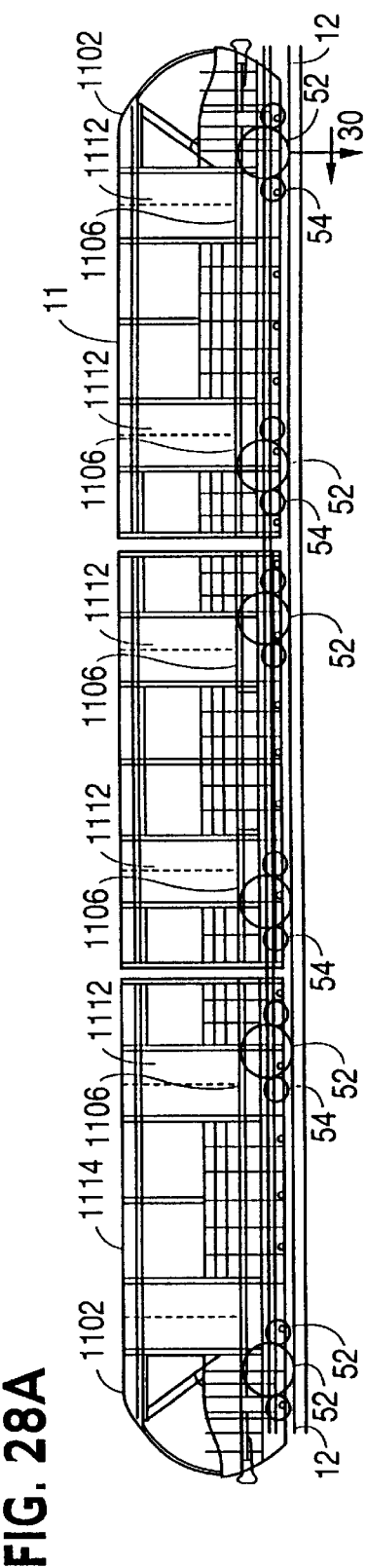

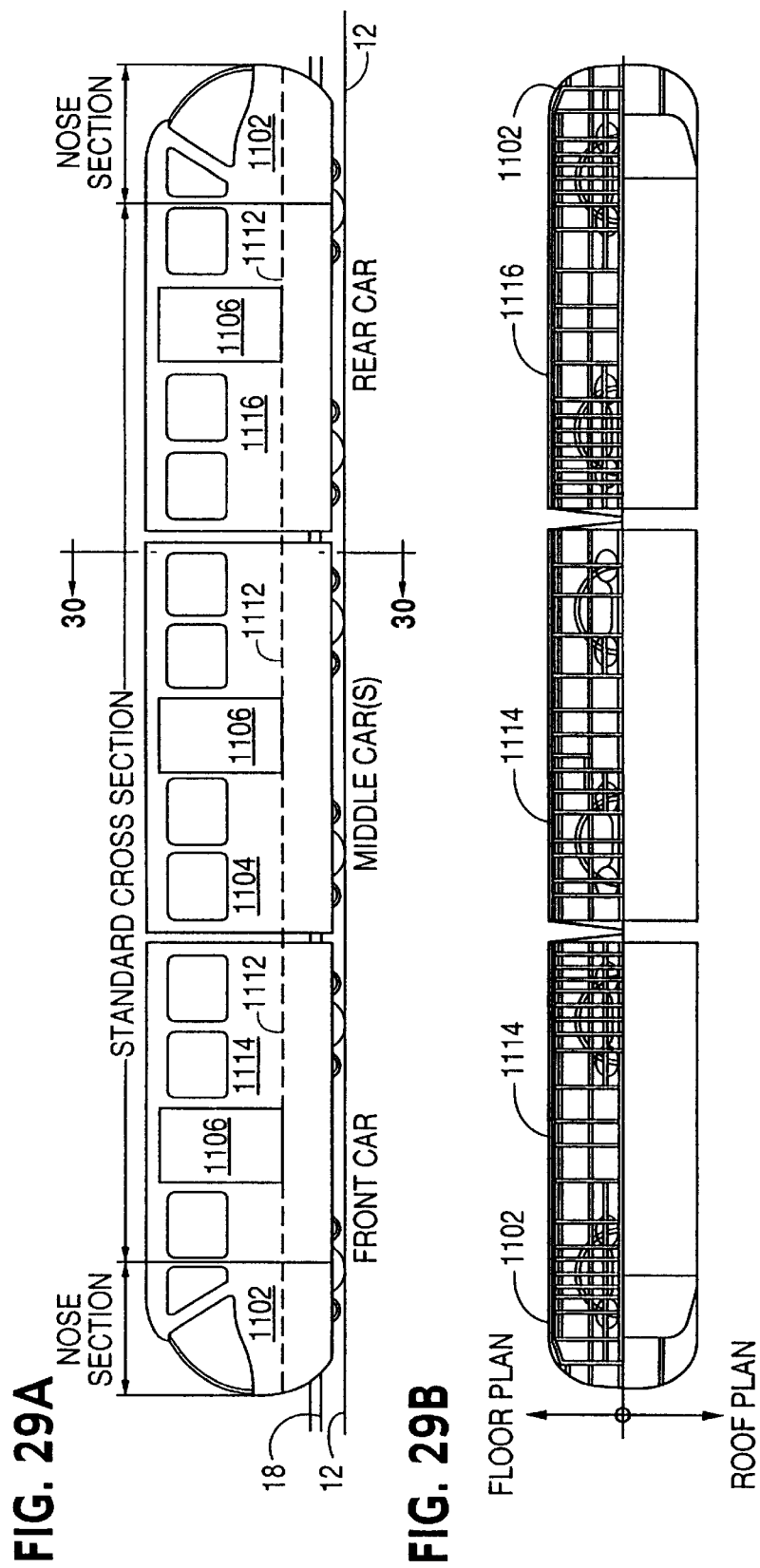

FIG. 33A
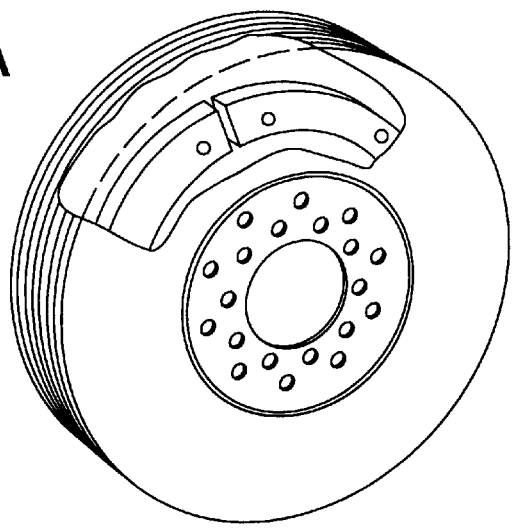
FIG. 33B
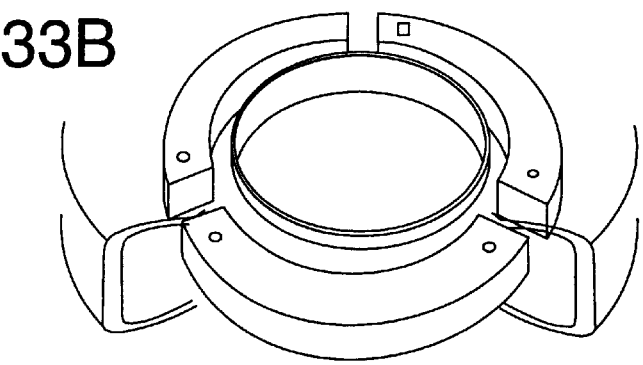
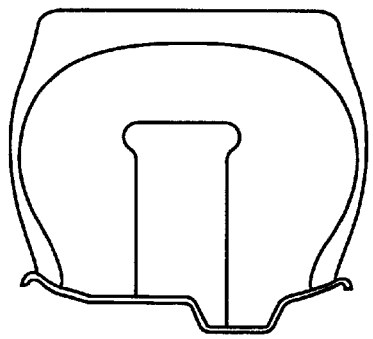
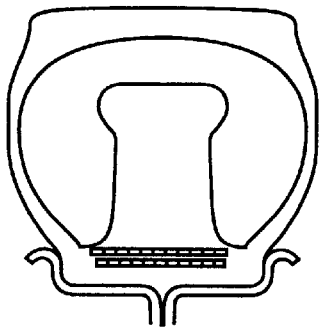
FIG. 33C          FIG. 33D

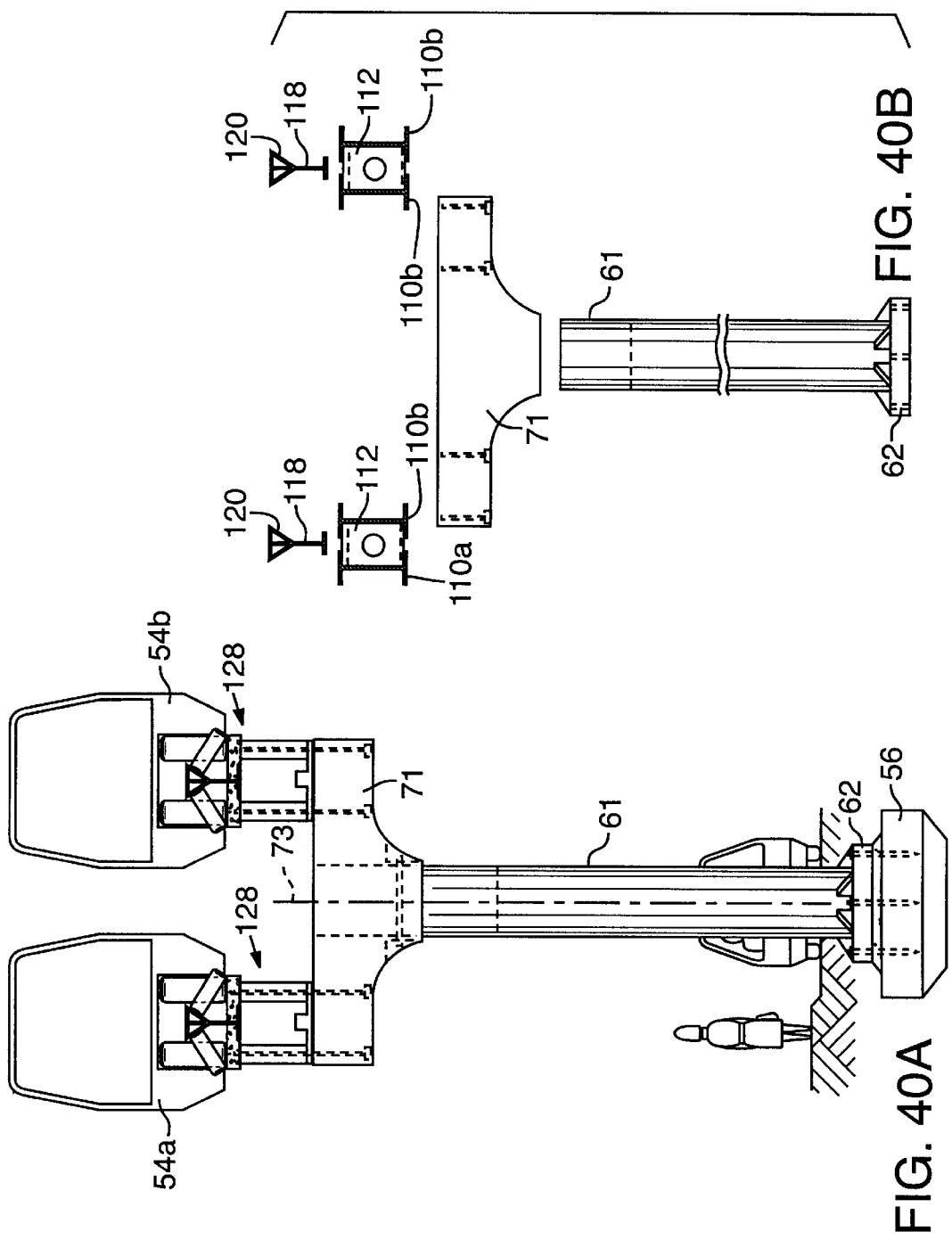

MONORAIL SYSTEM

This is a continuation-in-part of U.S. patent application Ser. No. 08/646,198, filed on May 7, 1996, which will issue as U.S. Pat. No. 5,845,581 on Dec. 8, 1998. This application also claims the benefit of U.S. Provisional Application No. 60/107,485, filed on Nov. 6, 1998, and U.S. Provisional Application No. 60/081,337 filed on Apr. 8, 1998.

BACKGROUND OF THE INVENTION

The present invention relates to an improved monorail passenger and light freight system, including a vehicle and improved rail for such a system.

Railed-vehicle systems, such as monorails, have numerous benefits, particularly in overcrowded urban environments where the surface streets are congested with traffic, and traditional forms of mass transportation, such as buses, must compete for space with existing traffic. For example, a dedicated elevated guide way vehicle system operates above city streets and therefore is immune from traffic congestion. It provides a quick and convenient way for moving people around a city, and it actually helps to relieve traffic congestion.

However, existing elevated railed-vehicle systems have several characteristics that have precluded their wide acceptance throughout the world. First, known support structures used to elevate the guide way are heavy and excessively large making them expensive to construct and install. Such structures are difficult to prefabricate at a central manufacturing facility and then transport easily to the location where they will ultimately be installed. Accordingly, the support structures must be individually manufactured directly on the site where they will be used. This time and expense of manufacturing such structures is a primary contributor to the excessive costs of elevated rail systems. In addition, variations in weather, temperature, and environment at each individual support structure manufacturing site combined with variations associated with continuously having to move and set-up the manufacturing equipment at each site make it difficult to efficiently control the quality and consistency of each manufactured support structure.

Moreover, known guide rails and running paths are prone to accumulate snow and ice, which may adversely affect vehicle operation. Similarly, known bogie, vehicle frames, guide rails, and rail switching devices are complex and expensive to construct.

Thus, there remains a need for railed-vehicle systems that can be consistently and economically prefabricated off-site and easily moved to the installation site, that provide improved stabilizer rail and bogie designs, that provide improved switching devices, and that provide improved construction shapes, designs and materials for use in rail, vehicle, and vehicle components.

BRIEF SUMMARY OF THE INVENTION

Fulfilling the forgoing needs is the primary objective of the invention.

The invention also includes a monorail system having one or more of the following improvements:

1. a monorail transportation system for passengers and light freight that is light and economical and enables free form construction at low cost;
2. a monorail system with a low profile stabilizer guide rail that communicates with vehicles with independent bogies that have electro-mechanical propulsion and suspension systems, magnetic levitation systems, or linear electrical motor systems for propelling the vehicles;
3. a monorail system with at least one longitudinal conductor mounted on and running parallel to the stabilizer guide rail and at least one electric cable received within and extending though the stabilizer guide rail to the longitudinal conductor;
4. a monorail system that provides a means for receiving, within a vehicle in a monorail system, electrical information through a conductor.
5. a monorail system having heated guide and/or stabilizer rails;
6. a monorail system having improved running path, guide rail and bogie designs to facilitate operation and construction of these systems;
7. a monorail system having alternative drive wheel configurations;
8. a monorail system having improved hardware and materials;
9. a monorail system having improved safety features; and
10. a monorail system having improved switching devices for switching between two or more guide ways;

Accordingly, the present invention provides an improved monorail system with an essentially planar top surface that includes (a) a means for support having an essentially planar top surface; (b) a longitudinal stabilizer guide rail with a vertical web supporting a head forming two stabilizer guide tracks that is mounted parallel to and on top of the planar top surface and dividing the planar top surface into two parallel vehicle running paths; (c) at least one propelled vehicle having a vehicle body and at least two independent bogies in communication with the vehicle running paths and the stabilizer guide rail and the bogies being able to rotate independently about a pivot point between the vehicle body and the bogies; and (d) at least one longitudinal conductor mounted on and running parallel to the stabilizer guide rail and one electric cable received within and extending through the stabilizer guide rail to the longitudinal conductor.

Improved vehicle, bogie, rail, and support structures and designs are also disclosed.

BRIEF DESCRIPTION OF THE DRAWINGS

The features of this invention that are believed to be novel are set forth with particularity in the appended claims. The invention itself, however, together with its objects and the advantages thereof, will be best understood by reference to the following description taken in connection with the accompanying drawings in which:

FIG. 1 is a sectional side view of a typical monorail system constructed according to the present invention including a vehicle running thereon.

FIG. 2 is a partial schematic sectional end view of the planar top surface and stabilizer guide rail with a wheeled vehicle running thereon.

FIG. 3 is a schematic sectional plan view of the planar top surface and stabilizer guide rail with an alternative wheeled vehicle running thereon.

FIG. 4 is an enlarged partial schematic sectional end view of the planar top surface and stabilizer guide rail showing the control conduits and insulated contact rails in greater detail.

FIG. 21 is a partial plan view of a cushion suspension and vehicle automatic leveling device in accordance with a preferred embodiment of the present invention.

FIG. 22 is a partial cross-sectional view of the cushion suspension and vehicle automatic leveling device taken along line 22—22 of FIG. 21.

FIG. 25 is an enlarged partial schematic sectional end view of the planar top surface and stabilizer guide rail showing possible alternative locations for the control conduits and insulated contact rails.

FIG. 26 is an enlarged partial schematic sectional end view of the planar top surface and stabilizer guide rail showing additional possible alternative locations for the control conduits and insulated contact rails.

FIG. 28A is a side view of a vehicle in accordance with a preferred embodiment of the present invention having three cars aligned in a train, each car framed in aircraft aluminum and having high floors.

FIG. 28B is a top plan view of the vehicle of FIG. 28A.

FIG. 29A is a side view of a vehicle in accordance with a preferred embodiment of the present invention having three cars aligned in a train, each car constructed of composite materials and having high floors.

FIG. 29B is a top plan view of the vehicle of FIG. 29A.

FIG. 33A is an isometric view of a run-flat tire for use on the monorail system in accordance with a preferred embodiment of the present invention.

FIG. 33B is an exploded isometric view of components included in the run-flat tire of FIG. 33A.

FIG. 33C a cross-sectional plan view of the run-flat tire of FIG. 33A in accordance with a preferred embodiment of the present invention.

FIG. 33D is a cross-sectional plan view of the run-flat tire of FIG. 33A in accordance with an alternative preferred embodiment of the present invention.

FIG. 40A is a front plan view of the guide way support structure in accordance with a preferred embodiment of the present invention.

FIG. 40B is an exploded plan view of the guide way support structure of FIG. 40A.

DETAILED DESCRIPTION OF THE INVENTION

Figure 5:
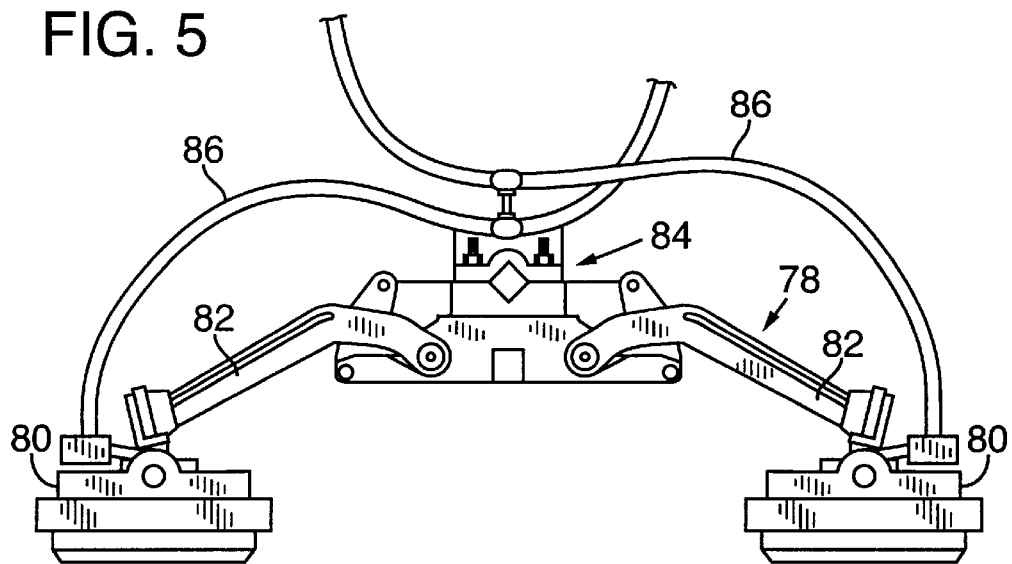
FIG. 5 is a top plan view of the double current collector of a preferred embodiment of present invention.

A monorail system including support structure, running path, guide rail, railed-vehicle, and devices for switching the railed vehicle between at least two running paths according to several embodiment of the invention is shown in FIGS. 1–40B.

A. General Manufacturing And Assembly

To provide comprehensive disclosure without unduly lengthening the specification, this specification hereby incorporates by reference the disclosures of U.S. Pat. No. 3,710,727 to Svensson which issued on Jan. 16, 1973; U.S. patent application Ser. No. 08/646,198 to Svensson filed on May 7, 1996; and Provisional U.S. Pat. app. Ser. No. 60/081,337 to Svensson filed on Apr. 8, 1998. These references provide greater detail regarding the construction, installation and use of guide ways, railed-vehicles, switching devices, and the like. Specific improvements to particular components are identified below. Unless specifically identified otherwise below, reference numerals refer to like numbered elements identified in the incorporated references.

Referring now to FIG. 1, the monorail system of the present invention includes a planar top surface 12 and one or more vehicles 30 running thereon. The planar top surface 12 may be the top of a concrete slab or more preferably a longitudinal beam 14. The concrete slab or longitudinal beam 14 may be a single continuous slab or beam or made up of a plurality of slabs or longitudinal beam sections (not shown) interconnected end to end by conventional means. The longitudinal beam 14 in cross section may be an inverted U-shape or a hollow rectangle or trapezoid, or any other hollow configuration providing a planar top surface 12. The instant invention may be adapted for use in a tunnel or subway setting, at ground level, or an elevated beamway above ground by support columns using conventional techniques or supported as disclosed in U.S. Pat. No. 3,710,727.

Mounted on top of and parallel to the planar top surface 12 is a stabilizer guide rail 18. As shown in FIGS. 2 and 3, the stabilizer guide rail 18 divides said planar top surface 12 into two parallel vehicle running paths 20. The stabilizer guide rail 18 may be made of either rigid or flexible materials except in the areas where the stabilizer guide rail 18 must be made of a flexible material to enable moving the stabilizer guide rail 18 from one planar top surface 12 to another planar top surface 12 as will be described below. Accordingly, the stabilizer guide rail 18 may be made of concrete, steel, aluminum, reinforced fiberglass, hard plastics or other suitable materials. If the stabilizer guide rail 18 is made of concrete, a metal or hard non-metallic cap (not shown) may be fitted on its head to reduce wear or cracking caused by vehicles running thereon as will be described hereafter.

As shown in FIG. 2, the stabilizer guide rail 18 includes a vertical web 22 supporting an upwardly and outwardly extending head 24 forming two stabilizer guide tracks 26. The vertical web 22 and head 24 may be hollow as shown in FIG. 2 or a modified I-beam as shown in FIG. 4.

The planar top surface 12 is approximately four feet wide for a full-scale system and is not more than half of the width of a full-size vehicle 30. The width of the planar top surface 12 will be smaller if the monorail system 10, including the vehicles 30, are constructed on a smaller scale.

As shown in FIGS. 2 and 3, the vehicle 30 consists of a vehicle body 32 and at least one bogie 40. Each bogie 40 includes a vertical and horizontal pivot point 42 and bogie frame 44. The vehicle 30 will have one of three propulsion systems (i.e., electro-mechanical power, magnetic levitation, or linear electrical motors), each of which will be discussed below. In each case, the vehicle body 32 rests on top of the bogie frames 44 through the suspension systems 46, allowing the bogies 40 to rotate independently of each other and the vehicle body 32 about a pivot 42. Preferably, the vehicle body 32 includes a vehicle chassis 34 with slots (not shown) for receiving the pivot point 42 for each bogie 40. The pivot point 42 is a shear pin.

As shown in FIG. 2, the chassis 34 also rests on a ring-shaped turn table 36, which communicates with the bogie frame 44 via rollers 38 and thereby provides added horizontal stability. The vehicle chassis 34 and bogie frames 44 may be made of steel, aluminum or fiberglass materials.

The primary suspension system for the vehicle 30 is provided in conjunction with the propulsion systems described below. A secondary vertical suspension may be provided by one or more pairs of vertical springs with lateral restraining 46 to keep the vehicle floor at the same level for different passenger or cargo loadings. The vertical springs 46 are located between the rollers 38 and the bogie frame 44. Preferably, the vertical springs 46 are automatic leveling and self-inflating air springs.

B. Electro-Mechanical Propulsion and Suspension System

One embodiment of the instant invention includes one or more electric powered bogies 40 with wheels. As shown in FIG. 2, each bogie 40 may include an axle 48 attached to the bogie frame 44 and positioned substantially perpendicular to the vehicle running paths 20. A drive wheel assembly 50 having one or more pairs of drive wheels 52 are attached to the axle 48. Alternatively, as shown in FIG. 3, each bogie 40 may include two axles 48 attached to the bogie frame 44 and positioned substantially perpendicular to the parallel vehicle running paths 20. One or more drive wheels 52 are attached to each axle 48. In both FIGS. 2 and 3, the drive wheels 52 are located inside the bogie frame 44 and adapted to run on the vehicle running paths 20. These drive wheels 52 may be solid, gas-filled, air-filled, or more preferably foam-filled rubber or synthetic rubber.

On a vehicle 30 longer than 12 feet, all electro-mechanical driven bogies 40 should include at least a first and second pair of guide wheels 54 separated by the drive wheels 52. On a vehicle 30 less than 12 feet long, only a single pair of guide wheels 54 need be associated with each set of drive wheels 52.

Each pair of guide wheels 54 straddles the stabilizer guide rail 18. Each individual guide wheel 54 is attached to the bogie frame 44 by a linkage 56 and is inclined to run along one stabilizer guide track 26. Preferably, the linkage 56 is a lateral suspension linkage that includes the following components shown in FIG. 2: a fixed bracket consisting of two spaced-apart plates 58 and 59 that are welded to the bogie frame 44 with a tube-shaped extension protruded down and in toward the stabilizer guide rail 18 about 30°±5°, an adjustment lever 62 connected by bolts to the fixed bracket plates 58 and 59 at one end of the adjustment lever 62 and to a guide wheel 54 at the other end of the lever 62, a controlled spring 60 between the fixed bracket plate 58 and the adjustment lever 62, a manual spring adjustment 64 controlling the spring 60 and adjustment lever 62, an automatic adjustment lever 66, and a vibration damper 68.

The spring 60 is preferably a controlled air pressure spring. Using the manual spring adjustment 64, one can tighten or loosen the spring 60 to adjust the amount of pressure the adjustable lever 62 causes the guide wheel 54 to exert against the stabilizer guide track 26. By releasing the spring 60 and the bolts between the adjustment lever 62 and the stabilizer guide wheel 54, the stabilizer guide wheel 54 can be rotated away from the stabilizer guide rail 18 and serviced. The automatic adjustment lever 66 adjusts for horizontal movement of the stabilizer guide wheel 54 as it moves in and out of curves in the stabilizer guide track 26 and stabilizes the linkage 56.

The spring-induced pressure of the guide wheels 54 against the inclined stabilizer guide track 26 minimizes the risk of overturning the vehicle 30, notwithstanding the centrifugal forces and wind that act upwardly on the cars during motion. The guide wheels 54 pressing against the inclined stabilizer guide track 26 generate a vertical force component that biases the drive wheels 52 downward for improved traction between the drive wheels 52 and the vehicle running paths 20. The guide wheels 54 steer the vehicle 30 by causing a small rotation of the bogie 40, which takes place independently of the vehicle body 32.

The vibration damper 68 is a pad or cushion around the bolt connecting the fixed bracket plates 58 and 59 to the lever 62. Preferably, the vibration damper 68 is a cube-shaped rubber cushion that is fixed between the bracket plates 58 and 59 and dampens vibration.

In this embodiment of the instant invention, the vehicle is propelled forward by one or more electric traction motors 70 and preferably operates on alternating current. In some instances, traction motors 70 will be fixed to only one of the bogies 40, usually the rear bogie 40. For large vehicles, traction motors 70 will be fixed to each of the bogies 40. If a single axle 48 is used in conjunction with the drive wheels 52 on a bogie 40, a single electric traction motor 70 may be fixed to said bogie frame 44 and communicate with said axle 48 through a gear mechanism 72. If as shown in FIG. 3, each bogie 40 includes two axles 48 attached to the bogie frame 44, two electric traction motors 70 may be fixed to the bogie frame 44 so that one motor 70 communicates with one axle 48 through a gear mechanism 72. Alternatively, an expandable drive shaft 74 may be coupled to and between each said gear mechanism 72 and each said electric traction motor 70 to enable attachment of the electric traction motor 70 to the vehicle floor frame 34 instead of the bogie frame 44. The motor could, however, be supported by the bogie mounted to the outside of the bogie frame.

Power for the electric traction motors 70 is obtained through electrical cables received within and extending through the stabilizer guide rail 18. These cables are connected to insulated contact rails 76 on the stabilizer guide rail 18. The conductive portion of the insulated contact rail 76 may be made of copper, aluminum, or any other suitable conductive material. Two insulated contact rails 76 are mounted on the stabilizer guide rail 18 if two-phase power is desired and three insulated contact rails 76 are mounted if three-phase power is desired. The use of insulated contact rails 76, instead of bare contact rails, enables closer spacing of the contact rails 76, results in a shorter stabilizer guide rail 18 (about 360 mm for the combined height of the head 24 and web 22), and increases safety of the monorail system 10 operation.

The power is picked up by current collectors 78 installed on the bogie frame 44 or vehicle floor frame 34. Preferably, the current collectors 78 are double current collectors shown in FIG. 5. More specifically, FIG. 5 is a top view of the double current collector 78 with a first and second collector heads 80, first and second collector pivot levers 82, collector mounting bracket 84, and first and second collector cables 86.

Figure 6:
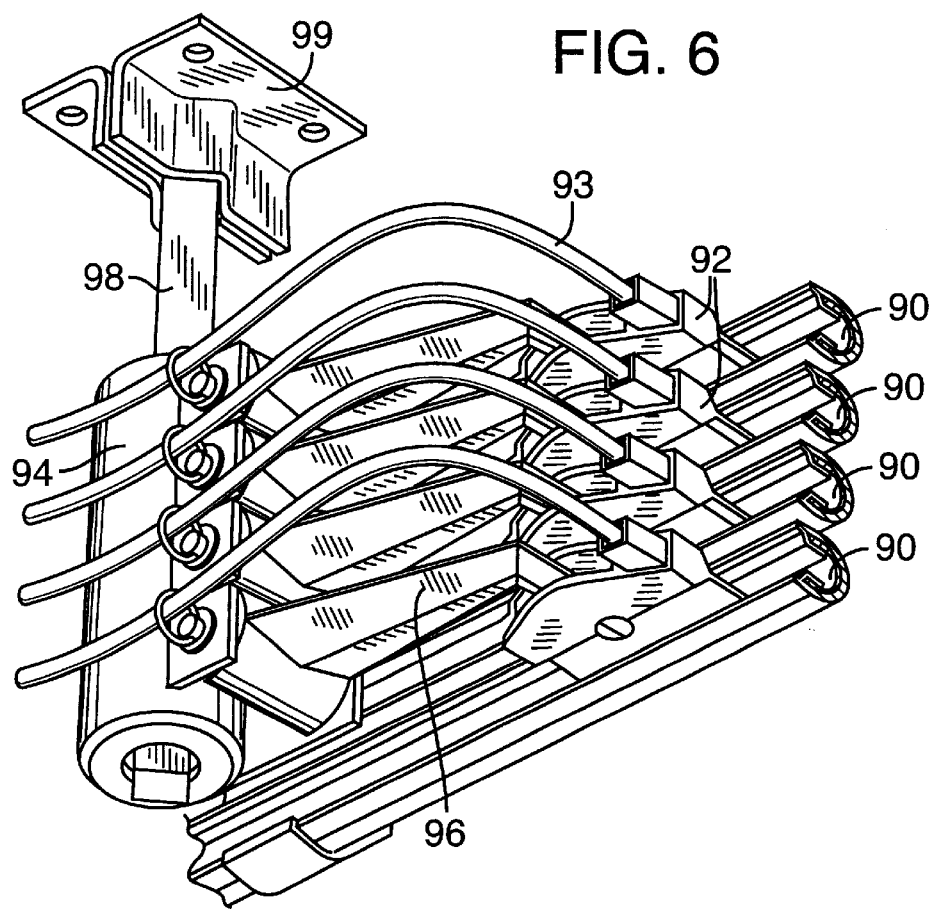
FIG. 6 is a partial schematic view of a guide way inductive communications collector in accordance with the preferred embodiment of the present invention.

A vehicle control and communication system (VCCS) consists of printed circuit assemblies that respond to guideway-inductive communications to regulate vehicle position and generated control functions for the vehicle 30. This would, for example, apply to brakes, motor propulsion demands, power loss, speed, temperature, and exit door closing. The VCCS is channeled through control conduits 90 mounted on the stabilizer guide rail 18. Preferably, the control conduits 90 are insulated and mounted on the opposite side of the stabilizer guide rail 18 from the insulated contact rails 76. As shown in FIG. 6, guideway inductive communications are picked up from the control conduits 90 by guideway-inductive communication collectors 92 and communication cables 93. The communication collectors 92 are attached to a communication collector hub 94 by collector arms 96. The communication collector hub 94 is mounted on the bogie frame 44 or vehicle floor frame 34 by mounting arm 98 and bracket 99.

Alternatively an antenna and radio receiver may be used to replace the guideway inductive communication collectors 92, collector hub 94, collector arms 96, mounting arm 98 and bracket 99.

Brakes (not shown) for the vehicles with electro-mechanical bogies 40 are mechanical brakes and dynamic brakes. The mechanical brakes are friction drum brakes or dual-piston caliper, electropneumatically operated. The mechanical brakes work in combination with the dynamic brakes in decelerating the vehicle from about 5 miles per hour to a full stop. Emergency braking is controlled by a pneumatic spring valve held off the friction brakes.

C. Magnetic Leviation System

Figure 7:
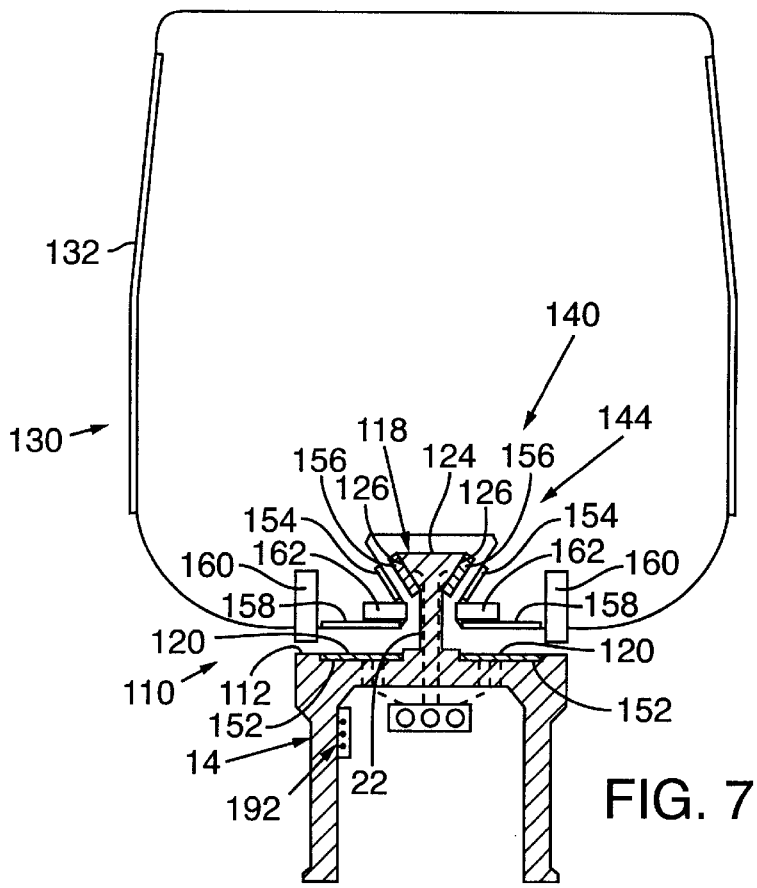
FIG. 7 is a partial schematic sectional end view of the planar top surface and stabilizer guide rail with a magnetically levitated and propelled vehicle running thereon.

A second embodiment of the instant invention involves the use of magnetically levitated and propelled bogies 140. Referring now to FIG. 7, the monorail system 110 also may be adapted to operate with magnetic levitation and propulsion ("Maglev Technology"). The general concept of levitating and propelling objects are known but have not been applied to monorails. For example, see U.S. Pat. No. 3,841,227.

Maglev Technology of the instant invention involves the use of a plurality of magnets in a vehicle 130, vehicle running paths 120 and stabilizer guide rail 118 in such a manner that during operation of the vehicle 130 there is no physical contact between the vehicle 130, the vehicle running paths 120 and the stabilizer guide rail 118.

There are two basic types of magnets in this second embodiment of the monorail system:

1. Stationary magnets 152 and 156, installed and recessed into the planar top surface 112 of the parallel vehicle running paths 120, and along the two stabilizer guide tracks 126 of the stabilizer guide rail 118; and
2. Traveling magnets 154 and 158 installed in the bogie frame 144 of the vehicle 130.

The stationary magnets 152 and 156 and traveling magnets 154 and 158 are aligned so that they repel each other during operation of the vehicle 130. Both the stationary and traveling magnets are coils of conductive material such as aluminum, titanium, copper, or combinations of titanium and aluminum.

The bogies of the electro-mechanical embodiment described above may be modified to accommodate the Maglev Technology. Drawing part numbers 10 through 44 of FIGS. 1 through 4 correspond to drawing part numbers 110 through 144 of FIG. 7.

Stabilization, steering, and control of the vehicle 130 are accomplished by having at least a first and second traveling guide magnet 154 within each bogie 140 and positioned on opposite vertical sides of the stabilizer guide rail 118 straddled by the bogie frame. These traveling guide magnets 154 operate in conjunction with repulsive stationary magnets 156 received along the stabilizer guide tracks 126 of the stabilizer guide rail 118. Collectively these traveling and stationary guide magnets 154 and 156 perform the same function as the guide wheels of the electro-mechanical embodiment, but without any component of the vehicle 130 ever directly contacting the stabilizer guide rail 118 during cruise operations.

Preferably, each traveling guide magnet 154 is attached to the bogie frame 144 through a linkage in a manner similar to the electro-mechanical embodiment; however, each traveling guide magnet 154 may be mounted directly to the bogie frame 144 provided the traveling guide magnet 154 is aligned with its adjacent stationary guide magnets 156. In addition, optimal performance and economy is obtained by providing one first and one second traveling guide magnet 154 per bogie frame 144; however, the vehicle 130 will operate effectively with additional traveling guide magnets 154 within each bogie frame 144.

An air gap between each traveling guide magnet 154 and its corresponding stationary guide magnets 156 may vary greatly between installations without adversely impacting the operation of the vehicle 130. Optimal performance for the monorail is obtained when this distance between the traveling guide magnets 154 and the stationary guide magnets 156 is 5 centimeters.

Levitation of the vehicle 130 is obtained in a similar fashion. For optimal performance, at least two traveling drive magnets 158 are mounted within each bogie frame 144 above the area to be occupied by the two parallel vehicle running paths 120. A plurality of stationary drive magnets 152, aligned to provide repulsive force to the corresponding traveling drive magnets 158, are mounted along the vehicle running paths 120. Collectively these traveling and stationary drive magnets 152 and 158 perform the same function as the drive wheel assembly of the electro-mechanical embodiment, but without any component of the vehicle 130 directly contacting the stabilizer guide rail 118 during cruise operation of the vehicle 130. Propulsion and braking of the vehicle 130 is accomplished by modulating the repulsive forces of the stationary and traveling drive magnets 156 and 158 using conventional techniques.

The pattern and size of the stationary magnets 152 and 156 can be designed and engineered for maximum power efficiency. For example, the pattern of these magnets can be "figure 8" shaped, and known as "null-flux" coils of titanium, aluminum, copper, or other conductive materials mounted in the vehicle running paths 120 on each side of the stabilizer guide rail and cross connected. In this configuration, the rectangular shaped traveling drive magnets 158 within each bogie frame would include four super conducting magnets to interact with the "null-flux" coils to generate propulsion, levitation, and guidance.

During initial start-up or during an emergency operation of the maglev system, the repulsive forces between the corresponding stationary and traveling drive magnets 152 and 158 and traveling and stationary guide magnets 154 and 156 may not be sufficient to levitate or steer the vehicle 130. Because of these situations, it may be desirable to incorporate emergency drive wheels 160 and emergency guide wheels 162 to prevent damage to the vehicle 130, stabilizer guide rail 118, bogies frames, or other components. It is preferable that these emergency drive wheels 160 and emergency guide wheels 162 are made of steel, or other rigid metal or alloy, are mounted on retractable axles (not shown), and have a diameter large enough to provide clearance between the stabilizer guide rail head 124 and the vehicle body 132. Alternatively, the emergency guide wheels 160 and emergency drive wheels 162 may be mounted and operated in a manner similar to the electro-mechanical embodiment.

The air gap between each traveling drive magnet 158 and its corresponding stationary drive magnets 152 may vary greatly between installations without adversely impacting the operation of the vehicle 130. Optimal performance for the monorail system is obtained when the drive magnets and tolerances are sized to obtain a 6 centimeter distance between these magnets during normal cruise operation.

The size of the stationary and traveling guide magnets 154 and 156 and stationary and traveling drive magnets 152 and 158 depends on the size, weight, and expected load requirements of the vehicle. In general, the drive magnets 152 and 158 should be able to create repulsive forces totaling twice the expected combined maximum load and weight of the vehicle 130. The guide magnets 154 and 156 should be able to create repulsive forces totaling twice the maximum expected lateral, centrifugal, and wind forces acting on the vehicle 130.

In order to optimize the required electro-magnetic repulsive forces, the planar top surface 112 and stabilizer guide rail 118 should be constructed with suitable non-magnetic material. The preferred material for the planar top surface 112 is concrete, however, suitable non-magnetic materials should be substituted for the steel and steel pre-stressing wires commonly used inside a concrete structure. The stabilizer guide rail 118 may be made from a variety of non-magnetic materials including, but not limited to, concrete and reinforced plastic.

Power to the traveling magnets 154 and 158 and vehicle 130 may be provided by a variety of methods. For example, similar to the electro-mechanical embodiment discussed above, insulated conductors may be mounted on the longitudinal stabilizer guide rail 118. However, because of the tight tolerances between the traveling magnets 154 and 158 and stationary magnets 152 and 156, the conductors may be mounted on the top of the stabilizer guide rail 118. Moreover, to help reduce electro-magnetic interference between the traveling magnets 154 and 158 and stationary magnets 152 and 156, it is preferred that the conductors be electro-magnetic. Power could also be provided to the vehicle 130 by batteries mounted within the vehicle 130.

Similarly, control commands may be transmitted to the vehicle 130 by a variety of methods. For example, similar to the electro-magnetic conductors providing power to the vehicle 130, control commands may be transmitted to the vehicle through a separate set of electro-magnetic conductors mounted on the top of the stabilizer guide rail 118. Alternatively, an inductive control system 192, may be similar to the vehicle control and communication system (VCCS) using an antenna described in the electro-mechanical embodiment may be implemented.

All power cables and control system 192 needed for the stationary magnets in the vehicle running paths 120 and the stabilizer guide rail 118 may be channeled up from below the vehicle running path 120 through the hollow web of the stabilizer guide rail 118 to the magnets.

D. Linear Induction Motor System

Figure 8:
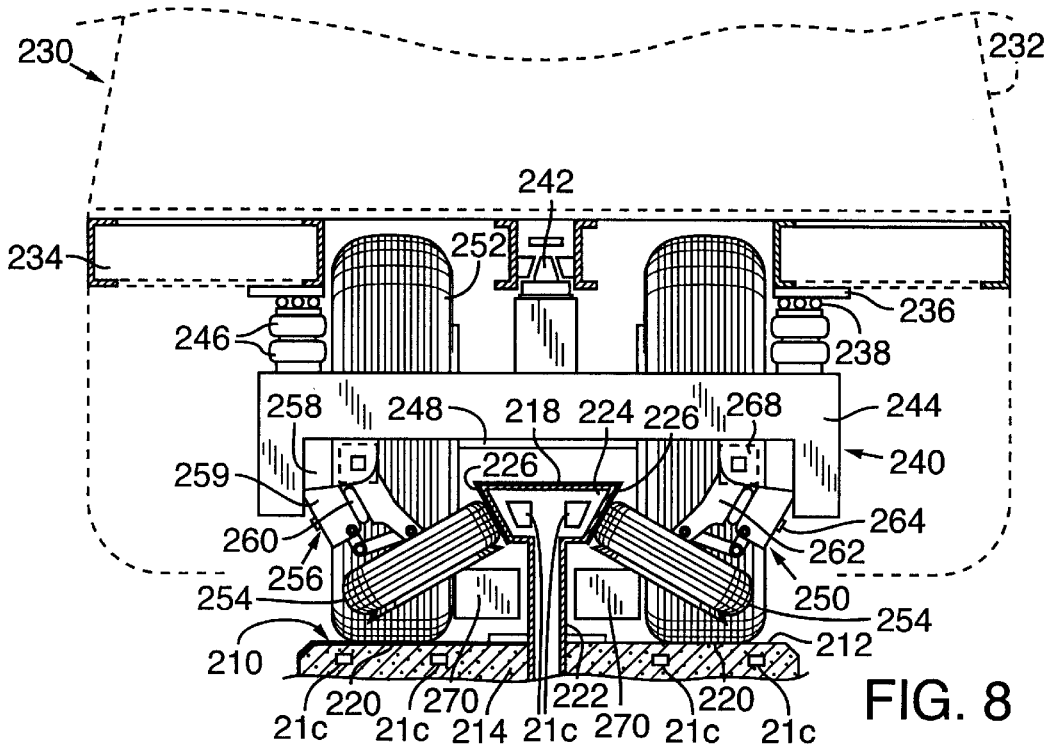
FIG. 8 is a partial schematic sectional end view of the planar top surface and stabilizer guide rail with a linear electrical motor propelled vehicle running thereon.

A third embodiment of the instant invention involves the use of linear electrical motor systems. See FIG. 8. Referring now to FIG. 8, another embodiment of the invention includes the application of a linear electric motor 270 received within the bogie frame 244 to propel the vehicle 230. In this embodiment, a linear electric motor 270 is substituted for the electrical traction motor of the electro-mechanical embodiment shown in FIGS. 1–4.

The bogies of the electro-mechanical embodiment described above may be modified to accommodate the linear electric motor 270. Drawing part numbers 10 through 66 of FIGS. 1 through 4 correspond to drawing part numbers 210 through 266 of FIG. 8.

A linear electric motor 270 is perhaps best understood by imagining the stator of an ordinary electrical motor being cut, unrolled and stretched lengthwise. An appropriate conductive material like copper, aluminum, or other material is positioned next to the unrolled stator. The alternating current in the unrolled stator provided by conventional techniques magnetically interacts with the conductive material to create a moving field of magnetic force acting on both the stator and the conductive material. The vehicle may be slowed down or stopped by reversing the polarity of that moving field.

By positioning a linear electric motor 270 on the vehicle 230 adjacent to a conductive material received along the web 222 of the longitudinal stabilizer guide rail 218, the vehicle can be propelled along the vehicle running paths 220. In this embodiment, the linear induction motor 270 may be on either side of the longitudinal stabilizer guide rail 218, or one linear induction motor 270 may be placed on each side of the longitudinal stabilizer guide rail 218.

Alternatively, a series of linear electric motors may be mounted along the web 222 and conductive material mounted on the bogie 240 or bogie frame 244 adjacent to the web 222. In situations where a linear electric motor 270 is mounted to the web 222, the longitudinal stabilizer guide rail 218 and the planar top surface 210 may be made of reinforced plastic, fiber glass, or other suitable non-conductive material.

For optimal performance, the distance between the linear electric motor 270 and conductive material mounted on the bogie 240 or bogie frame 244 should be not more than one half an inch.

In situations where it is desirable to install the linear electric motor 270 within the bogie, the linear electric motor 270 may be sized to fit below and between the lateral suspension linkage 256 and adjacent to the web 222. The linear electric motor 270 also may be attached to the bogie frame 244 through mounting brackets (not shown).

Power to the linear electric motor 270 may be provided by a variety of techniques. In situations where there is only one linear electric motor 270 adjacent to the longitudinal stabilizer guide rail 218, insulated power and control conductors may be positioned on the opposite side of the web 222 containing the required conductive material. Alternatively, if a linear electric motor 270 is installed on each side of the longitudinal stabilizer guide rail 218, insulated power and control conductors may be positioned along the top of the longitudinal stabilizer guide rail head 224. In addition, a longitudinal stabilizer guide rail 218 having an open web 222 may be used. In that case, insulated power and control conductors may be positioned along the vehicle running path 220. Also, power to the linear electric motor 270 and other ancillary electrical components may be provided by rechargeable batteries (not shown) positioned within the vehicle 230.

One skilled in the art will readily see that it is possible to combine technologies such that a vehicle can be propelled by a linear electric motor installed along the stabilizer guide rail and magnetically levitated by magnets installed in the running path and along the stabilizer guide tracks.

E. Vehicle Pathway Switch

Figure 9:
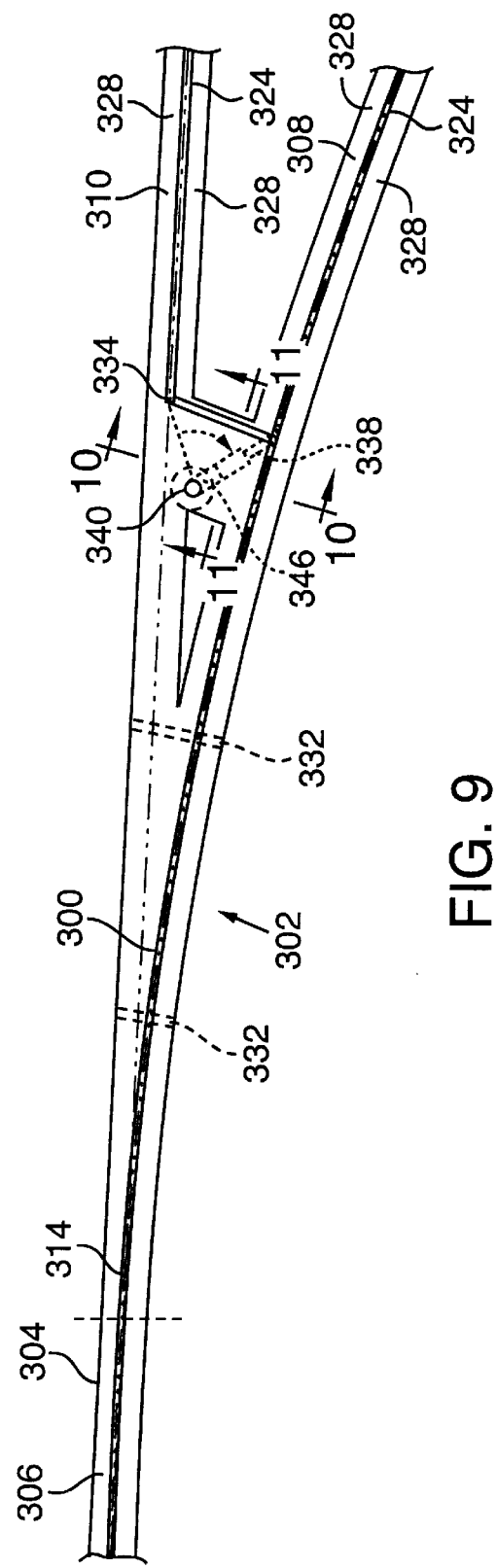
FIG. 9 is a plan view of one embodiment of a switch made according to the present invention including the flexible stabilizer guide rail shown in the switched position.
Figure 10:
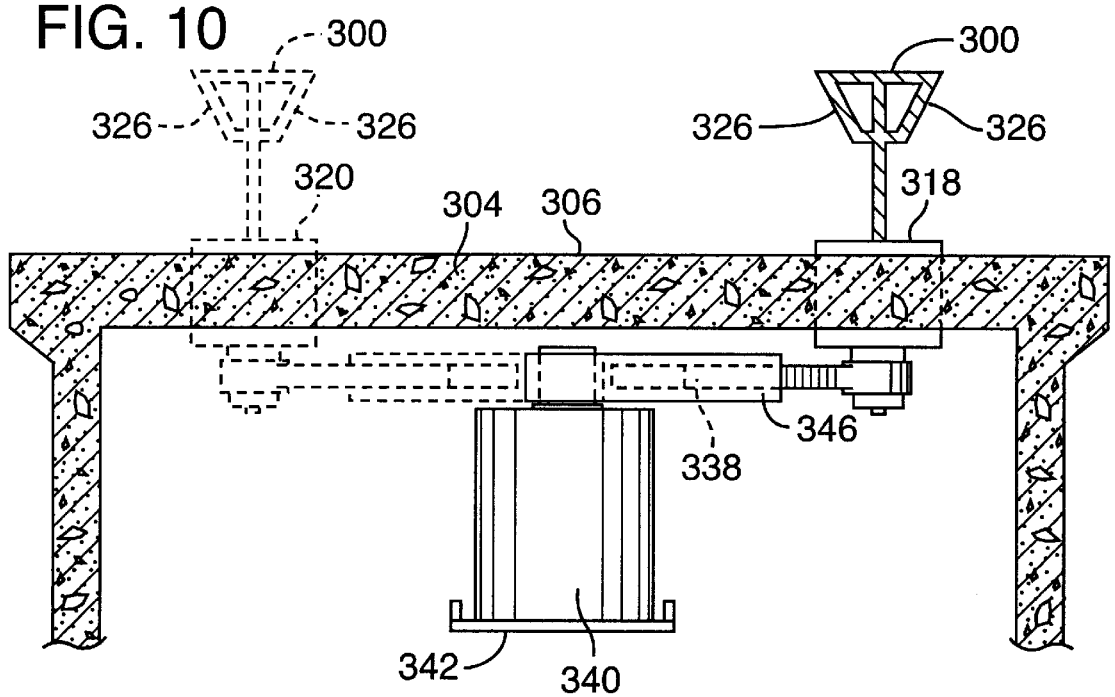
FIG. 10 is an end sectional view of an embodiment of the switch having a crank motor an lever arm assembly along the line 10—10 in FIG. 9.
Figure 11:
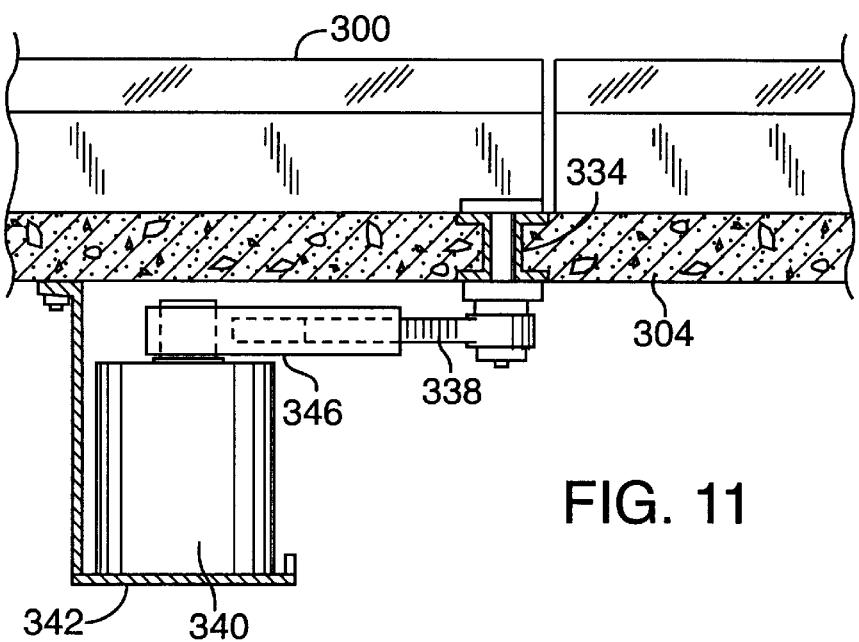
FIG. 11 is a side sectional view of an embodiment of the switch having a crank motor and lever arm assembly along the line 11—11 in FIG. 9.
Figure 12:
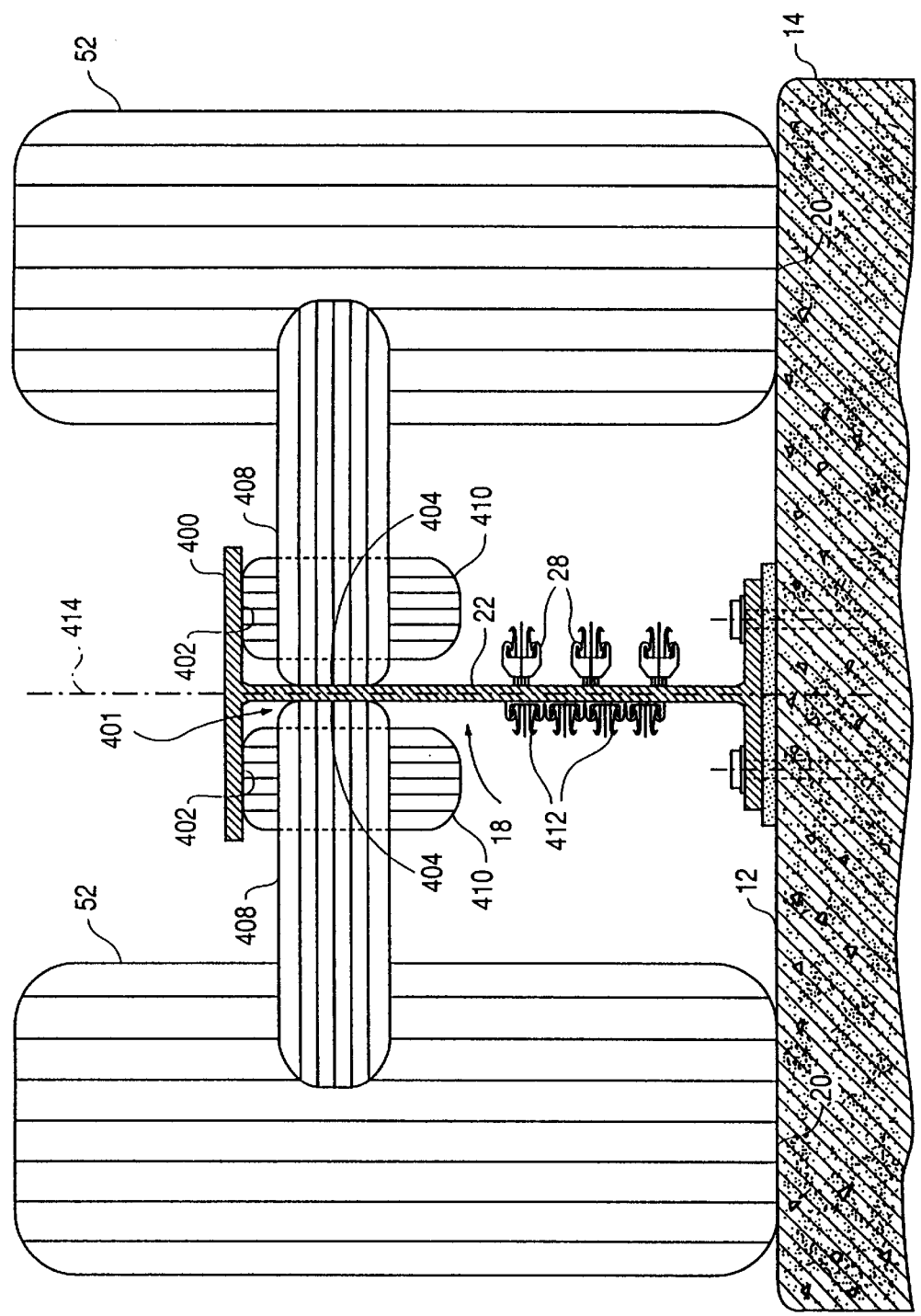
FIG. 12 is an enlarged partial schematic sectional end view of a planar top surface, stabilizer guide rail, and guide wheel arrangement in accordance with a preferred embodiment of the present invention.

Another improvement of the invention involves the ability to easily switch the vehicle 330 between two or more vehicle running paths 328. FIGS. 9, 10, & 11. The present invention permits a vehicle to be switched from one planar top running surface 306 to another simply by pivoting a flexible stabilizer guide rail 300 of predetermined length between two planar top surfaces 306 and 310. The switch itself may be constructed and supported using traditional methods, materials, or techniques disclosed in U.S. Pat. No. 3,710,727.

Referring now to FIG. 9, an improved pathway switch 302 is disclosed. The system includes an essentially Y-shaped vehicle pathway 304 having an essentially planar top surface 306. The Y-shaped vehicle pathway 304 is joined at its foot to a single planar top surface 306 and at its arms to a second planar top surface 308 and a third planar top surface 310, respectively. A flexible stabilizer guide rail 300 has one end fixedly mounted near the foot or base of the Y-shaped vehicle pathway 304 by, for example, pins, while its other end is movable between the arms of the Y-shaped vehicle pathway 304. FIG. 10 shows the flexible stabilizer guide rail 300 in its first position 318 and second position 320, respectively.

The flexible stabilizer guide rail 300 may be made of steel, aluminum or plastic reinforced fiberglass or other suitable material so long as the material is flexible in the transverse direction and has strength sufficient to withstand the forces exerted thereon by the passing vehicle. The length of the flexible stabilizer guide rail 300 vary with the design speed of the vehicle. Thus, at higher speeds, a longer flexible stabilizer guide rail 300 is needed. For example, while the vehicle is in the maintenance yard and operated at slow speeds, the switch may be only twenty five feet long.

The flexible stabilizer guide rail 300 has at least one electric cable received within it providing power to at least one continuous longitudinal insulated conductor mounted to the flexible stabilizer guide rail 300. The flexible stabilizer guide rail 300 is electrically connected to continuous longitudinal insulated conductor mounted to the flexible stabilizer guide rail 300 at the foot of the Y-shaped vehicle pathway 304.

Each arm of the Y-shaped vehicle pathway 304 includes a stabilizer guide rail 324 having a vertical web (not shown) supporting an upwardly and outwardly extending head (not shown) forming two stabilizer guide tracks 326. Each stabilizer guide rail 324 is mounted parallel to and on top of the Y-shaped vehicle pathway 304 dividing the planar top surface into two parallel vehicle running paths 328. Both stabilizer guide rails 324 in the arms of the Y-shaped vehicle pathway 304 have at least one insulated electrical contact at or near their ends closest to the foot of the Y-shaped vehicle pathway 304. Each stabilizer guide 324 rail has at least one electric cable received within it providing power to at least one continuous longitudinal insulated conductor mounted to the stabilizer guide rail 324.

For each finally commanded position of the flexible stabilizer guide rail 300, at least one electrical contact at the moving end of the flexible stabilizer guide rail 300 aligns a corresponding contact on the stabilizer guide rail 324 in one of the arms of the Y-shaped vehicle pathway 304 to close the electrical circuit. This alignment permits a continuous insulated conductor along the path of the vehicle through the pathway switch.

It is envisioned that this technique of providing continuous electrical connections to the vehicle 330 through the switch also may be used to provide operation and control signals discussed above in the description of other embodiments. Moreover, the switch components may be made from suitable non-conducting or non-magnetic materials as required to permit any of the previously discussed embodiments to effectively operate thereon.

FIGS. 9, 10 and 11 disclose one embodiment of a switch for moving one end of the flexible stabilizer guide rail 300 between the arms of the Y-shaped vehicle pathway 304. The flexible stabilizer guide rail 300 has a guide foot adapted to be movably inserted in at least one guide slot 332 in the Y-shaped vehicle pathway 304. The guide slot 332 runs between the diverging arms of the Y-shaped vehicle pathway 300 and may be supported by braces or simply cut into the Y-shaped vehicle pathway 304. Preferably, the guide slot 332 and guide foot are either greased metal or plastic to aid passage the guide foot along the guide slot 332.

A drive slot 334 running through the Y-shaped vehicle pathway 304 between the diverging arms of the Y-shaped vehicle pathway 304 aids moving the end of the flexible stabilizer guide rail 300. The movable end of the flexible stabilizer guide rail 300 has a drive foot that is movably received within the drive slot 334. Preferably, the drive slot 334 and drive foot may be either greased metal or plastic to allow easy passage of the drive foot along the drive slot 334. The drive slot has a narrow opening that extends through the bottom of the Y-shaped vehicle pathway 304. A lever arm 338 is pivotally attached to the drive foot through the narrow opening on the bottom of the Y-shaped vehicle pathway 304.

A crank motor 340 is attached below the Y-shaped vehicle pathway 304 with a support bracket 342. An expandable lever arm 346 is pivotally attached to the crank motor 340 and linked to the lever arm 338 such that operation of the crank motor 340 drives both the expandable lever arm 346 and lever arm 338 and thereby moves the flexible stabilizer guide rail 300 between its first position on one arm and its second position on the other arm of the Y-shaped vehicle pathway 304.

Other means such as driven rollers connected directly to the flexible stabilizer guide rail 300 or a hydraulic cylinder and piston arrangement, or pulleys and pulley drive motor may also be used to deflect the flexible stabilizer guide rail 300.

The monorail system of the present invention can be built to different scales of size. The "full scale" system is applicable to trunklines and commuter vehicles (trains) with potential large volumes of passenger traffic per hour. It also can be used for transporting light freight. Vehicles for the "full scale" system may be, for example, 30 feet long, 10 feet wide and approximately 10 feet tall when measured from the top of the vehicle running path to the top of the vehicle's roof. The width of the planar top surface would be approximately 4 feet.

A "half scale" system involves light vehicles, loads and smaller construction. Vehicles can be made small enough for 6 seated people. For example, a "half scale" vehicle may be 12 feet long, 5.5 feet wide and 6 feet tall. Several vehicles could be connected into trains. Size of the monorail structure could be sized down, too, so that the width of the planar top surface is approximately 30 inches. This size would have great applicability within industry, shopping centers, recreational and amusement, airports, fairs, and zoos.

For switching operations with the noted sizes of the "full scale" and "half scale" systems, the moveable end of the flexible stabilizer guide rail is displaced only a small amount between its first position and second position—180 centimeters for a "full scale" vehicle and 115 centimeters for a small "half scale" vehicle. The length of the flexible stabilizer guide rail will determine how fast each of these vehicles may go through the switch. For optimal high speed switching the flexible stabilizer guide rail should be longer than 75 feet.

Intermediate sized systems also could be built. In addition, a "half scale" vehicle could be adapted to run on the same monorail structure as a "full scale" vehicle as long as the bogie of the "half scale" vehicle can straddle and operate on the stabilizer guide rail normally used for "full scale" vehicles.

F. Heated Running Paths and Guide Rail

Referring specifically to FIGS. 2, 4, and 8, heated running paths and/or guide rails are disclosed. In environments where the monorail system may operate in below freezing weather, it may be desirable to heat the running paths and/or guide rails to prevent ice and snow from building up on these structures.

Devices for economically heating these paths and rails include imbedding heating conduits such as fluid pipes 21*b* (FIG. 2), thermal warming cables 21*a* (FIG. 4), or warm air ducts 21*c* (FIG. 8) in the running paths 20 and head 24. The warming medium, such as electricity or warm fluid or air, is provided to the conduits with known methods and devices, and activated when needed, preferably through an automated control system.

Alternatively, existing contact rails 76 and control conduits 90 may be modified to transfer heat from these rails and conduits the their adjacent areas, thereby warming the areas around the running paths and guide rail. Moreover, the longitudinal beam may be thermally insulated to retain any stored or accumulated heat, thereby reducing the likelihood of snow or ice build-up.

G. Alternative Bogie Designs, Guide Rail Designs, and Drive System Configurations Referring to FIG. 12, an alternative preferred stabilizer guide rail 400 and Bogie configuration is disclosed. This configuration includes planar top surface 12, longitudinal beam 14, top stabilizer guide rail 18, vehicle running paths 20, head portion 401, vertical web 22, uplift wheel running paths 402, stabilizer wheel guide tracks 404, stabilizer wheels 408, uplift wheels 410, drive wheel tires 52, current collectors 28, control conduits 412, centerline 414 of monorail, guide way and guide rail, bogie frame 416, anchor bolts 418 positioned between gearbox and disk brake, motor 420, planetary gear box 422, disk brake 424, disk brake caliper 426, drive wheel hub 428, wheel hub stud bolts 430, low floor 432 in vehicle, seating level 434 above tires, and drive wheel flange 436.

In particular, the guide rail 400 includes a standard wide flange or I-beam without any additional particularly-shaped head configuration. Horizontal stabilizer guide wheels 408 are positioned on the bogie such that they run against the top end portion 401 of the web 22, in front and behind the traction drive wheels. Also, one pair of vertical uplift wheels 410 are positioned as shown between the two pairs of stabilizer guide wheels 408.

The two sets of wheels 408 and 410 have separate functions. Namely, the horizontal guide wheels 408 steer the vehicle, but they also resist over turning of the vehicle as the vehicle travels along the guide rail. The vertical wheels 410, which are preferably pre-loaded to give better traction on the drive wheels especially during curves, also act as safety emergency wheels to prevent overturning of the vehicle. The vertical wheels 410 will resist uplift forces that may arise during extreme centrifugal and lateral wind forces acting on the vehicle, particularly when the vehicle is operating on a curved, super-elevated (i.e. tilted) guide way, thereby keeping the vehicle on track during these adverse conditions.

Figure 13:
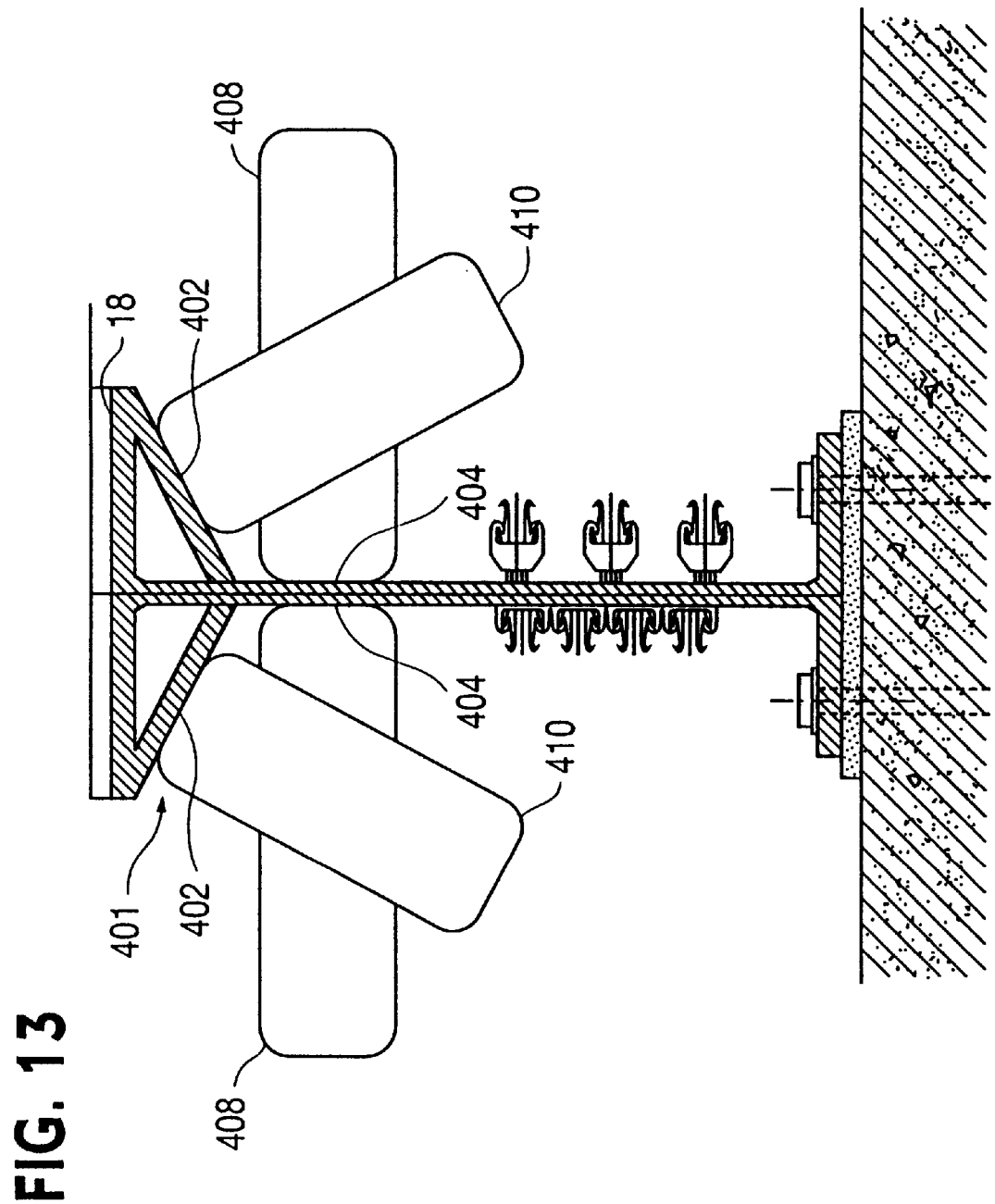
FIG. 13 is an enlarged partial schematic sectional end view of a planar top surface, stabilizer guide rail, and guide wheel arrangement in accordance with a preferred embodiment of the present invention.

Alternatively, as shown in FIG. 13, the head of the I-Beam may be slightly angled. Accordingly, the vertical uplift wheels would be mounted in the slightly angled position as shown to run along this angled head. Preferably, six guide wheels will be installed on each bogie, as opposed to the four guide wheel arrangement disclosed in U.S. patent application Ser. No. 08/646,198. The addition of the two additional guide wheels reduces the likelihood of the vehicle derailing.

Figure 14:
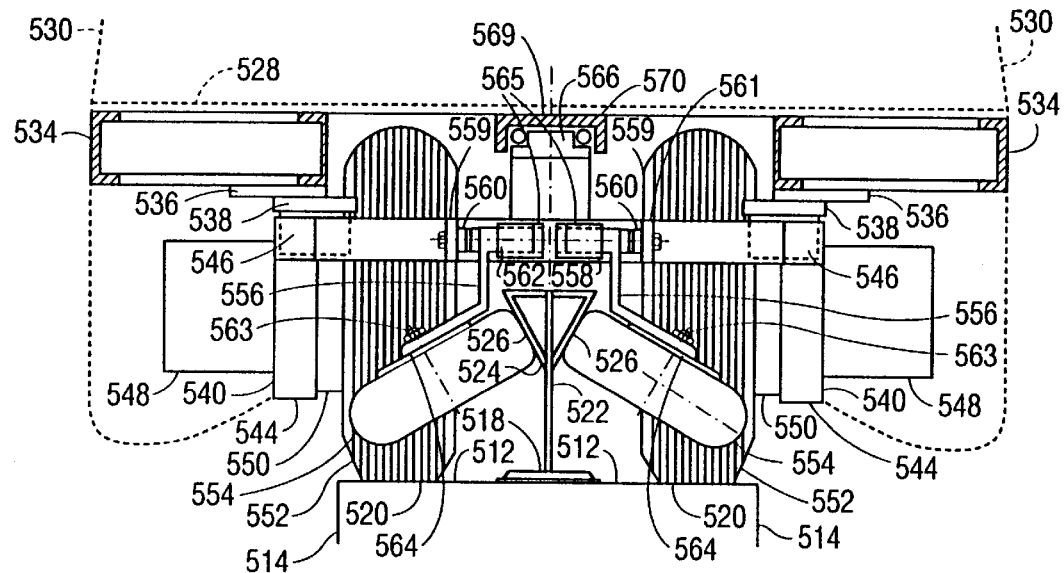
FIG. 14 is a partial schematic sectional end view of a planar top surface and stabilizer guide rail with a wheeled vehicle having a guide wheel suspension system in accordance with a preferred embodiment of the present invention.
Figure 15:
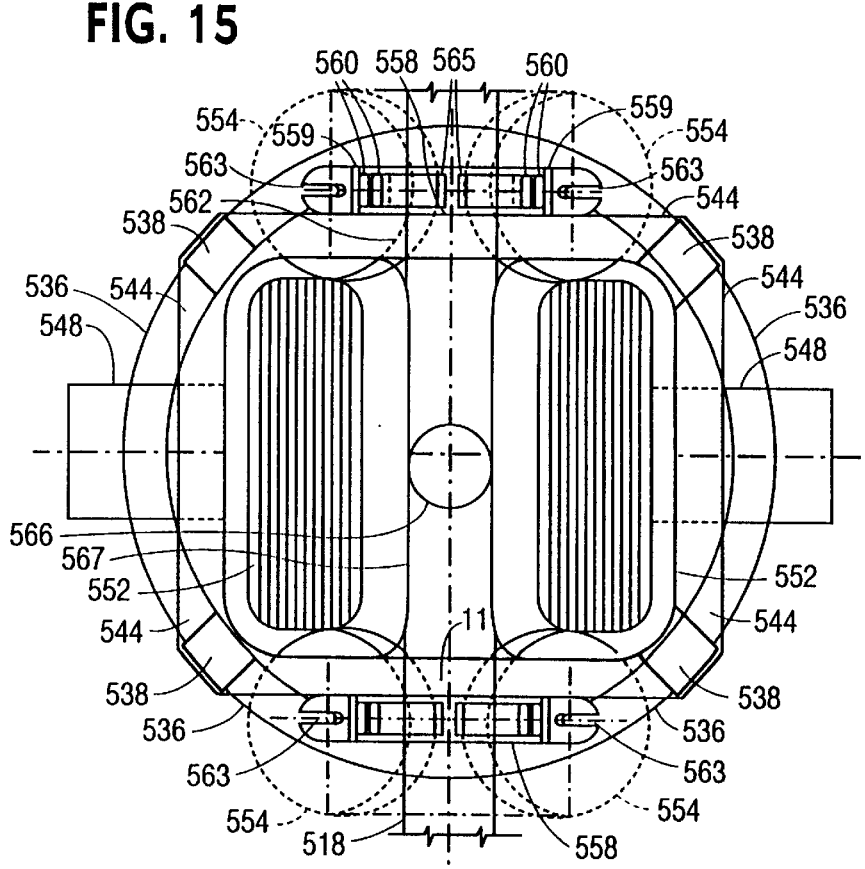
FIG. 15 is a partial schematic sectional plan view of the suspension system of FIG. 14.

Referring now to FIGS. 14 and 15, an alternative preferred stabilizer guide wheel and suspension system 511 is disclosed. This guide wheel and suspension system 511 includes planar top surface 512, longitudinal beam 514, stabilizer guide rail 518, vehicle running paths 520, vertical web 522, head 524, stabilizer guide tracks 526, floor surface 528 inside vehicle 530, vehicle body 532, vehicle floor frame 534, ring-shaped turntable 536 positioned under floor frame, sliding bearing surface 538 between turntable 536 and bearing, bogie 540, bogie frame 544, vehicle body vertical suspension pocket 546, motor 548 in wheel hub, caliper brake 549, gear box 550 in wheel hub, or motor 551 positioned at a right angle to axle, drive wheels 552, gear 553 positioned at a right angle to axle, stabilizer guide wheels 554, adjustable lever arm linkage 556 for guide wheel support assembly, fixed guide wheel sliding pocket frame 558 attached to bogie frame, fixed support bracket 559 for lever assembly welded to bogie frame to prevent wheel derailment, adjustable air pressure spring cushions 560 positioned between linkage 556 and bracket 559, bolt assembly 561, sliding piston with pocket frame 562, adjustable attachment 563 of guide wheel to lever arm, built-in suspension dampening device 564 positioned between lever arm and guide wheel hub, vacuum or low air pressure compartment 565 positioned at the end of pocket frame, bogie frame pivot ring 566, bogie frame support cross-brace 567 for pivot ring loading, floor frame ring support 568, sliding pivot ball bearing ring 569 positioned between bogie frame pivot and floor frame of vehicle, vertical sliding area 570 positioned between floor frame and bogie frame, and circular end sections 572 of bogie frame and cross-brace.

In particular, as best shown in FIGS. 14 and 15, the suspension 511 includes a tube type assembly 558 fixed to the front and read end frames of the wheel bogie 544 between two end brackets 559 that are welded to the bogie frame 544. Two stabilizer guide wheels 554 with a sliding piston pocket frame 562 are forced against the stabilizer guide tracks 526 by respective lever arms 556 that have remote pressure controlled air pads 560 acting between the lever arms 556 and the fixed brackets 559.

Figure 23:
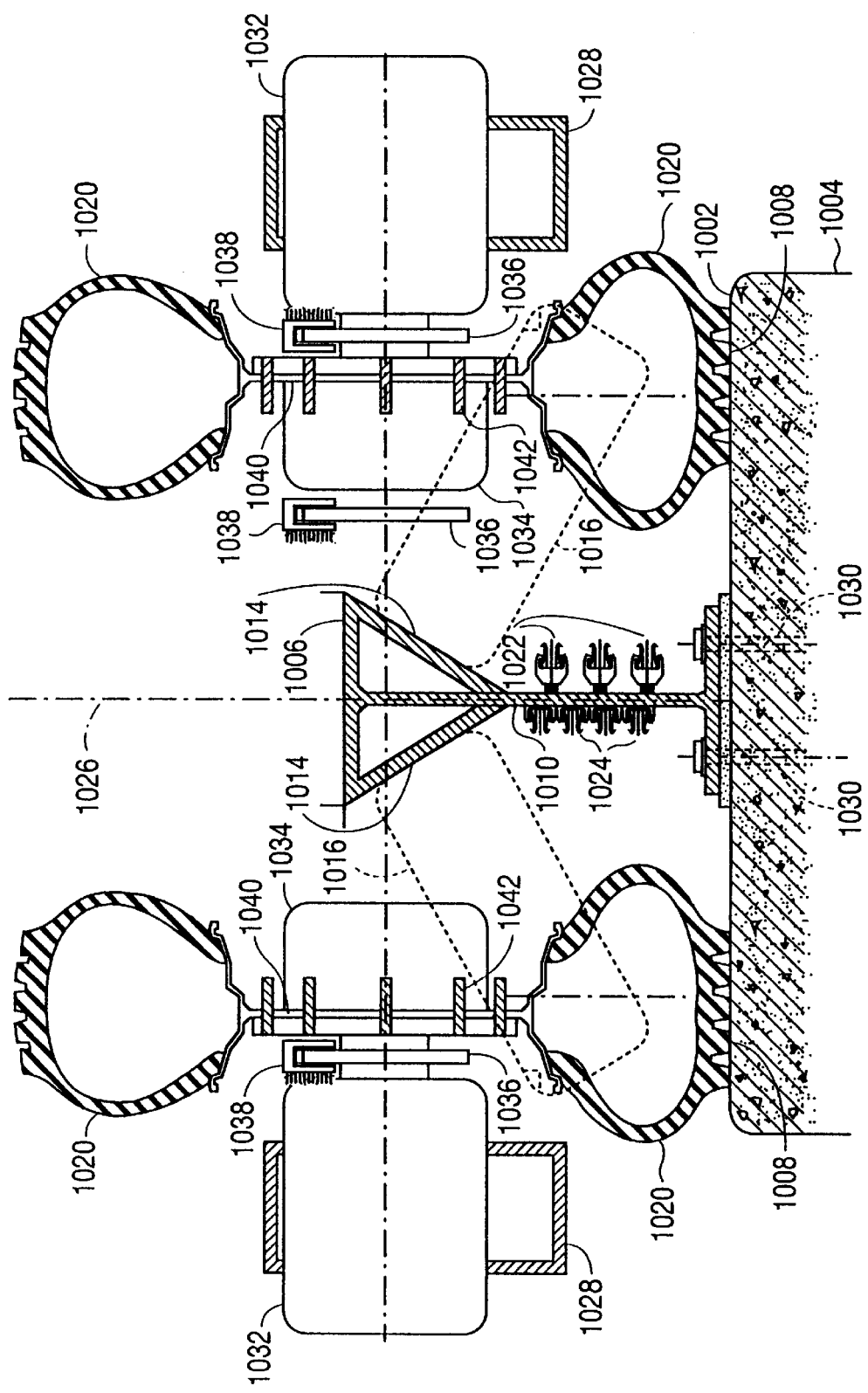
FIG. 23 is an enlarged partial schematic plan view of a compact motor-gear-brake assembly built into the wheel hubs of the drive wheels in accordance with a preferred embodiment of the present invention.
Figure 24:
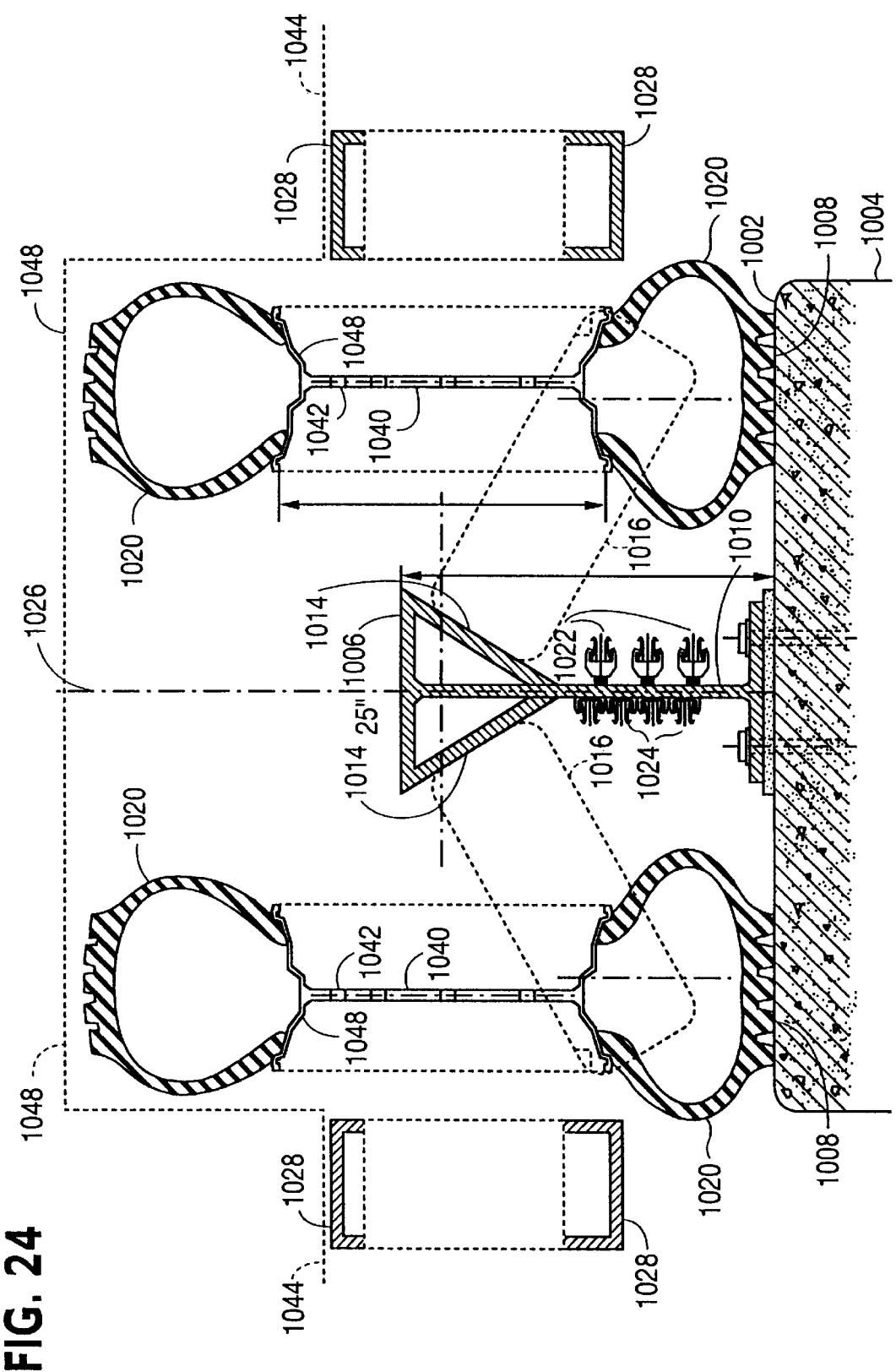
FIG. 24 is an enlarged partial schematic plan view of a bogie assembly for receiving the motor-gear-brake assembly of FIG. 23.

The stabilizer guide wheel 554 includes the built-in suspension dampening device 564 between the lever arm 556 and the axle attachment 563. The wheel bogie unit 540 with a built in axle-free motor 548 and gear box with brake 550, as shown in FIGS. 23 and 24, are partially built into the drive wheel 552 hub and rotate independently horizontally about a ball bearing ring 566 attached to the longitudinal cross-brace 567 of the bogie frame 544. The rotation of the wheel bogie 540 takes place within a small circular turntable 556 fixed to the floor 534 of the vehicle 530.

With the above configuration, all lateral forces such as those arising during windy conditions, acceleration and braking of the vehicle, and centrifugal forces acting on the vehicle are transferred through the floor 534 to the turntable 569 and then to the bogie frame pivot ring 566. These forces are thereby resisted by guide wheel assembly 511 with the guide wheels 554 acting against the stabilizer 518. Similarly, vertical forces acting on the vehicle 530 are transferred through the bogie perimeter turntable ring 536, then through the sliding bearing surface 538 to the pocket suspension 546 built into the bogie frame 544 as shown in, and described with respect to, FIGS. 22–25.

Figure 16:
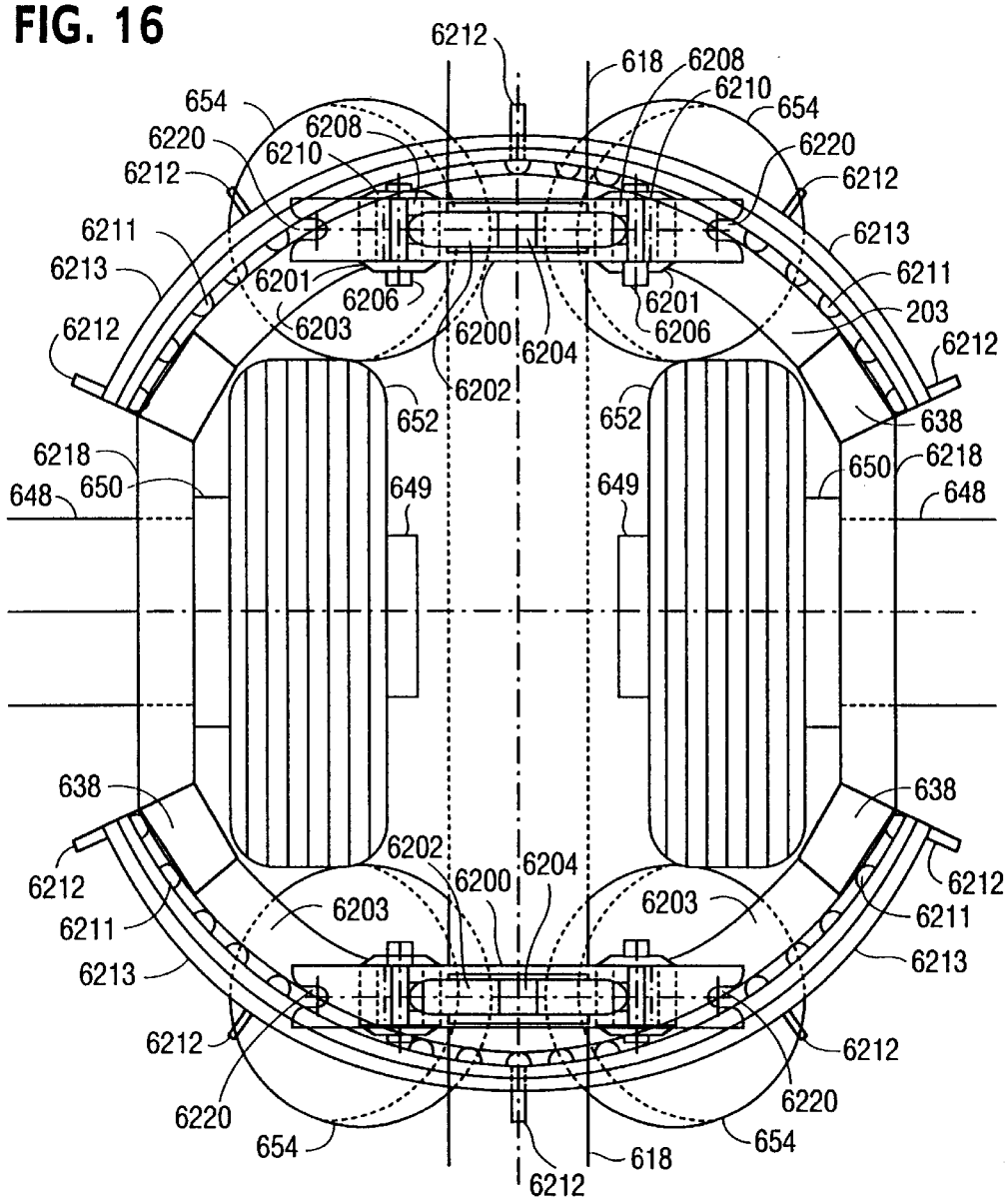
FIG. 16 is a partial schematic sectional plan view of a circular wheel bogie in accordance with an alternative preferred embodiment of the present invention.
Figure 17:
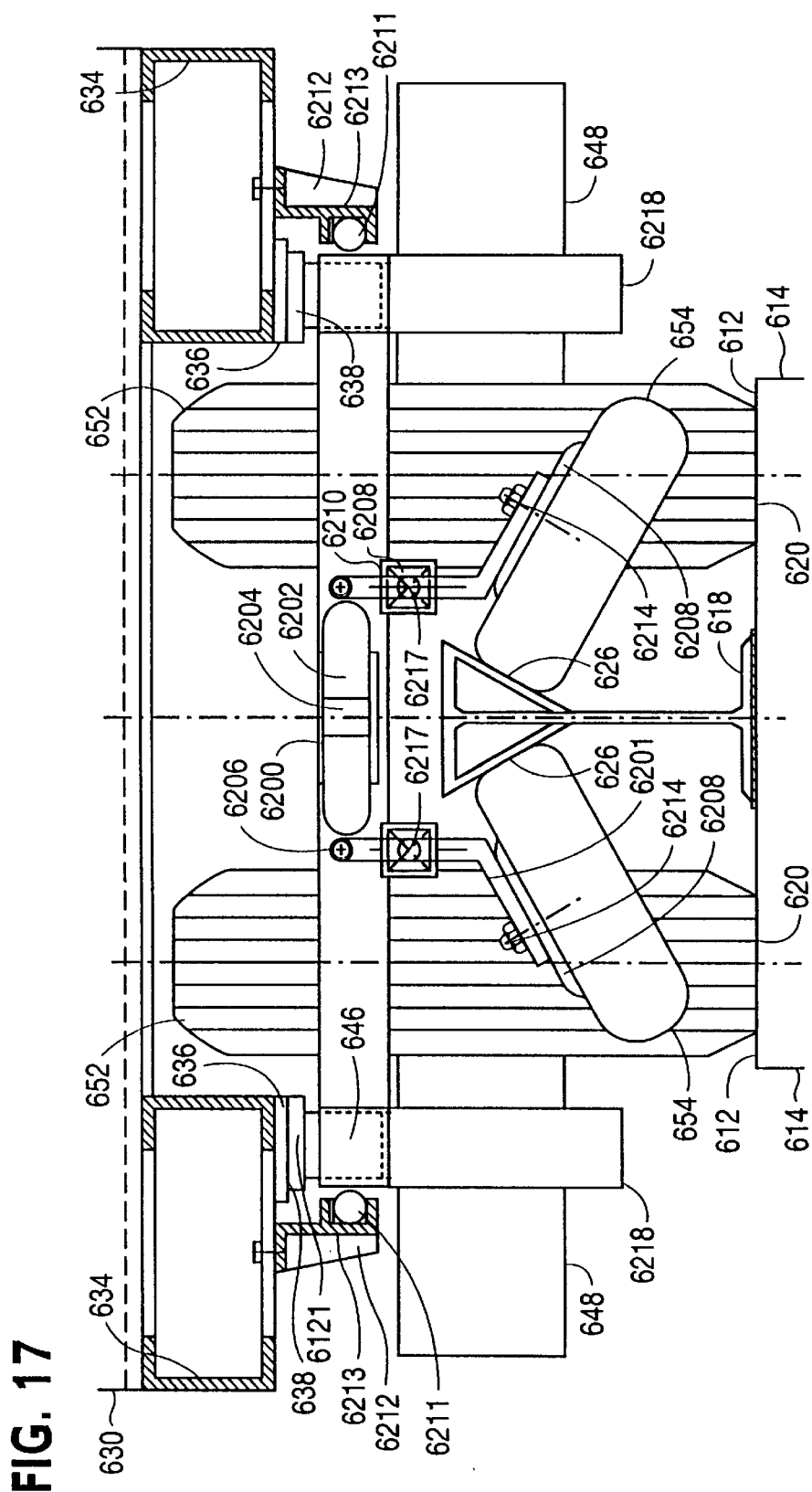
FIG. 17 is an enlarged partial schematic sectional end view of the circular wheel bogie of FIG. 16 showing possible orientation on a stabilizer guide rail.
Figure 18:
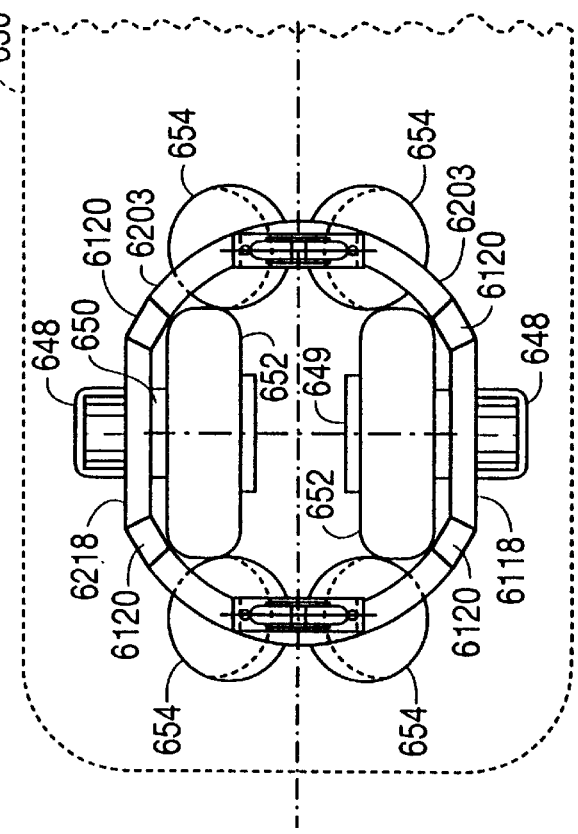
FIG. 18 is a partial schematic sectional plan view of a circular wheel bogie without a cross-brace in accordance with a preferred embodiment of the present invention.

Referring now to FIGS. 16–18, alternative circular wheel bogies with a perimeter ball bearing turntable are disclosed. These embodiments include a stabilizer guide wheel assembly 6200, lever arm 6201 for guide wheel assembly, piston 6202 for guide wheel assembly, controlled air pressure pocket 6204 in piston 6202, link 6206 between piston 6202 and lever arm 6201, internal guide wheel vibration dampening device 6208, tube compartment 6210 for rubber vibration damper, ball bearing 6211, stiffener bracket 6212 for ball bearing turntable, axle bolt attachment 6214 for guide wheel, irregular shaped bolt 6217 attached inside to vibration material, wheel bogie frame 6218, and slot 6220 for axle bolt and guide wheel adjustment.

Specifically, an open circular wheel bogie frame 6218 without a center crossbrace is disclosed in FIGS. 16 and 17. Referring specifically to FIG. 16, the stabilizer guide wheel assembly 6200 includes a piston 6202 with controlled air pressure 6204 inside thereof. The air pressure 6204 is created within chamber partially defined by the front and read end circular shaped bogie frame portion 6203 as shown. A lever arm 6201 extends from a hinge 6206 at the end of the piston 6202 through a tube compartment 6210 to the guide wheel attachment 6214. The tube compartment 6210 has a resilient, such as rubber or similar material, vibration damper 6208 built into a tubular shaped compartment 6208 that is fixed to the bogie frame below. As the controlled air pressure 6204 within piston 6200 expends, the lever arm 6210 will rotate and twist the rubber assembly 6216 about the pivot bolt 6217 forcing increased pressure on the guide wheel 654 against the stabilizer guide tracks 626 of the stabilizer guide rail 618.

Referring now to FIG. 17, the bogie frame 6218 includes a circular bogie frame portion 6203 and the piston 6202 with controlled air pressure 6204 within the piston assembly 6200, and the rubber vibration damper compartment 6210. The guide wheel can easily be removed with the open slot 6220 (FIG. 16) for the axle bolt attachment 6214.

The guide wheel assembly 6200 is quite simple and requires little space and adaptation since it is partly built into the circular wheel bogie portion 6203. Moreover, since the unique lever arm mechanism and suspension is locked into the bogie frame 6203, the likelihood of inadvertent derailment of the stabilizer guide wheel 654 is greatly reduced.

Referring now to FIG. 18, a circular wheel bogie including a bogie frame 6218 having two circular front and rear end sections 6203 and no interior cross brace is disclosed. Specifically, during acceleration and braking of the vehicle, the forces acting on the drive wheels 652 and the wheel bogie 6218 are transferred through a perimeter circular ball bearing frame 6212 (FIG. 17) attached to the floor frame 634 of the vehicle 630, as shown in FIGS. 16 and 17. The wheel bogie 6218 rotates within the ball bearing perimeter ring 6212 (FIG. 17), which transfers horizontal wind and lateral centrifugal forces into the floor frame 634 of the vehicle 630. The vertical forces from the vehicle 630 are transferred through the four rectangular bearing and suspension pocket devices 6120 in the bogie frame 6218. The Motor-Gear-Brake assembly 648, 650, 649, respectively, is axle free, and partially built into the drive wheel hub 652 as shown in FIGS. 23 and 24.

Figure 19:
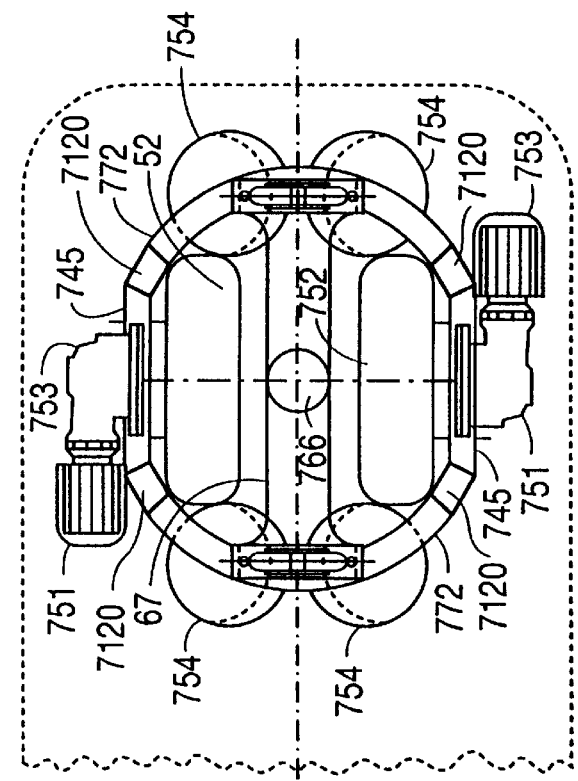
FIG. 19 is a partial schematic sectional plan view of a circular wheel bogie having a cross-brace and showing possible orientation of drive gears and motors in accordance with a preferred embodiment of the present invention.

Referring now to FIG. 19, a circular wheel bogie including a bogie frame 745 having a cross-brace 767 between two circular end sections 772 with a pivot ring 766 in the middle thereof is disclosed. The pivot ring 766 works much like the pivot bolt disclosed in U.S. patent application Ser. No. 08/646,198. However, forces are distributed over a larger ring area. Accordingly, the wheel bogie is provided with greater stability.

The pivot ring 766 transfers horizontal forces, such as those arising during windy conditions or lateral acceleration of the vehicle, through a circular perimeter ball bearing frame 769 outside the pivot ring that is part of the floor frame 734 of the vehicle 730. The vertical forces form the vehicle 730 are transferred though the four bearing and suspension pockets 7120. The motor 751 is supported by the wheel bogie 745 with a right angle gear-pinion 753 arrangement.

Figure 20:
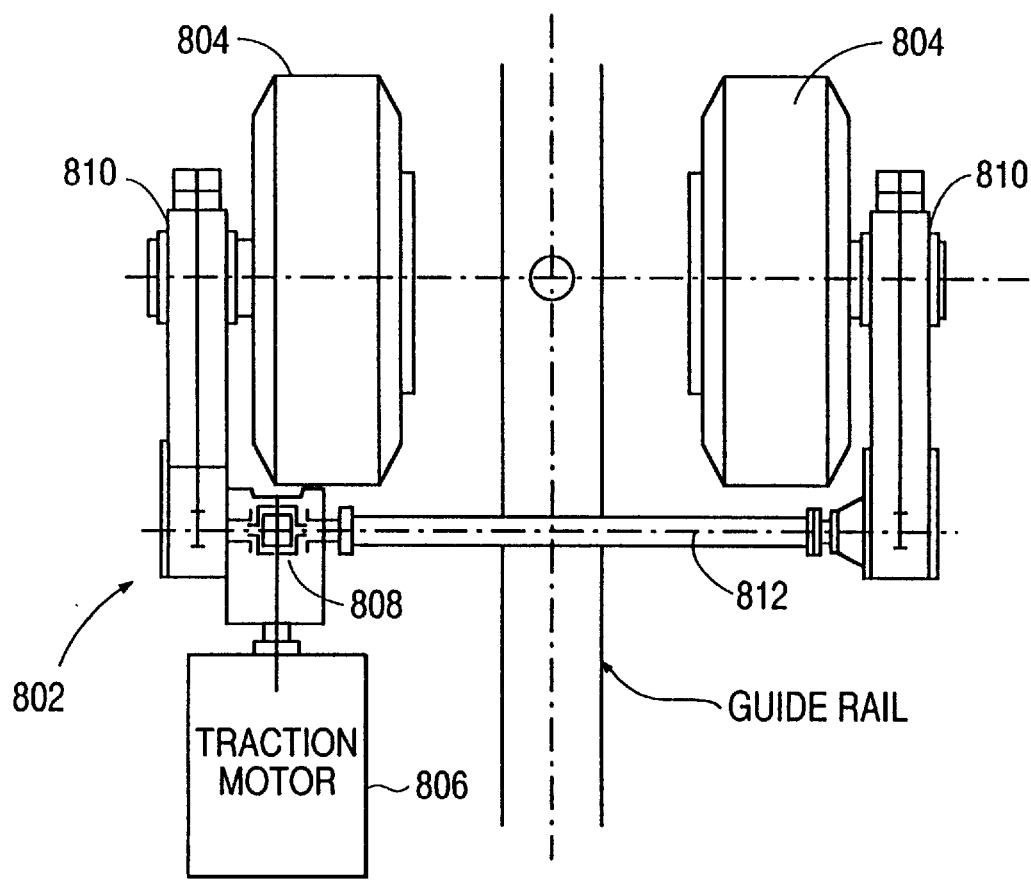
FIG. 20 is a partial schematic sectional plan view of an alternative drive system showing possible orientation of drive gears and motor in accordance with a preferred embodiment of the present invention.

Referring now to FIG. 20 a drive system 802 for mechanically coupling two drive wheels 804 to one motor 806 is disclosed. In particular, the drive system includes a straight bevel-gear unit 808 and a spur-gear unit 810 defining a differential. The gear units 808 and 810 are interconnected by a low-lying high-speed cross link shaft 812.

The present design allows for a low floor height across the full length of the passenger compartment. Moreover, the low-lying cross link shaft permits a torsionally rigid connection the wheels in order to maintain sinusoidal motion during straight away operation. The use of the differential results in less stain on the transmission when cornering, less wear on the tires, and less noise.

Referring now to FIGS. 21 and 22 a monorail vehicle air cushion suspension and vehicle automatic leveling device 9120 is disclosed. The suspension and leveling device 9120 includes a vehicle bearing support piece 9121, vertical sides 9122 of the bearing support, control pressure valve 9124, air cushion suspension pads 9125, vertical side 9126 of recessed pocket in the bogie frame, cushioning layers 9127 between air pads, turntable ring 9130 attached below the vehicle floor frame, vehicle bogie frame exterior surface 9131, and vehicle bogie frame interior surface 9132.

In particular, the drive wheel tires 952 are the primary vertical suspension of the monorail vehicle. The vertical secondary suspension consists of four rectangular air suspension devices 9120 recessed into a pocket 946 in the bogie frame 940. Each air suspension device, which may consist of one or several air cushion pads 9125, has a bearing support piece 9121 on top that is partially recessed into the bogie frame 9131. The bearing support is shaped so it can slightly deflect vertically 9122 into the bogie frame 940, but not substantially horizontally.

The bearing support 9121, which has a sliding surface 938 on top, transfers the weight of the vehicle through the turntable ring 936 attached to the vehicle floor frame 934 to the air cushion pads below 9125. The air cushion pads 9125 are connected to an automatic air pressure control valve 9124 that keeps the bearing support 9121 at the same level.

The sliding bearing support surface 938 is made of a hard surface material having a low sliding friction coefficient, such as Teflon or graphite. When the vehicle travels through the curved section of the guide way, the wheel bogie 940 rotates relative to the car body 930. This rotation takes place between the sliding bearing support surface 938 and the turntable ring 936. The air cushion suspension operates through the curved section and during the straight sections.

Special cushioning materials for dampening vertical impacts on the vehicle, are built into the three horizontal layers 9127 of the air spring pads. The number of pads, hardness and dampening characteristics of these layers vary with the vehicle size and the anticipated vertical loading.

The vehicle's secondary vibration has two functions. First, it works as a secondary vibration and dampening suspension device to resist impact and other types of loading on the vehicle during acceleration and different speeds. Second, it serves as an automatic leveling device, so the floor level inside the vehicle is kept at the same elevation at all times, independent of the number of passenger in the vehicle. For example, when the vehicle is heavily loaded with passengers, the automatic controlled air pressure valve 9124 will increase the pressure in the suspension air pads 9125. Likewise, when there are few or no passengers in the vehicle, the automatic air pressure valve will reduce the air pressure in the suspension pads. Thus, the vehicle floor surface at passenger loading and unloading facilities will expedite passengers more efficiently through the doors, and accommodate disabled wheel chair passengers by allowing them to roll the chair on or off the vehicle without floor elevation differences, since the vehicle floor and loading ramp will be at the same level all the time.

Referring now to FIGS. 23 and 24, a pre-manufactured, compact, axle free, Motor-Gear-Brake ("MGB") assembly built into the wheel hub of the traction drive wheel for the monorail system is disclosed. This configuration includes planar top surface 1002, longitudinal beam 1004, top stabilizer guide rail 1006, vehicle running paths 1008, vertical web 1010, uplift wheel running paths 1012, stabilizer wheel guide tracks 1014, stabilizer wheels 1016, uplift wheels 1018, drive wheel tire 1020, current collectors 1022, control conduits 1024, centerline 1026, of monorail, guide way and guide rail, bogie frame 1028, anchor bolts 1030 positioned between gearbox and disk brake, motor 1032, planetary gear box 1034, disk brake 1036, disk brake caliper 1038, drive wheel hub 1040, wheel hub stud bolts 1042, low floor 1044 in vehicle, seating level 1046 above tires, and drive wheel flange 1048.

In particular, referring to FIG. 23, the motor, planetary gearbox and caliper disk brake are all a compact unit built along the center line of the wheel hub and partly inside the hub. The MGB unit is supported by the bogie frame and the wheel flange, and no axle is needed for the drive wheel.

In one possible preferred embodiment, a standard 19.5 inch wheel flange of steel or aluminum is used. The MGB can be manufactured and shipped as one unit, and can be mounted directly into the unmounted bogie frame shown in FIG. 24. As a result, the bogie will be light weight, less costly and less complex than known alternatives.

FIG. 23 shows the caliper disk in two possible locations with respect to the bogie frame, wheel flange, and gear box. For the left drive wheel, the disk brake is located between the bogie frame and the wheel flange. For the right drive wheel, the brake is mounted to the end of the planetary gear box. Input or dynamic brakes can also be built into the compact gear box unit. One known manufacturer of dynamic brakes is Fairfield in LaFayette, Ind., U.S.A.

The MGB assembly allows for large rotation about the pivot point of the wheel bogie when the vehicle travels through sharp curves.

H. Position Of Current Collectors

Referring now to FIGS. 25 and 26, alternative locations for possible positioning of the insulated power conduits 76 and control conduits 90 are disclosed. In particular, in FIG. 26, the power conduits 76 are positioned on top of the head 24 and the control conduits 90 are mounted on the lower flange 77 of the stabilizer guide rail as shown. Alternatively, as shown in FIG. 27, the power conduits 76 may be positioned on the lower flange 77 and the control conduits 90 may be positioned on top of the head. Of course, any combination of these conduit position's and the conduit positions noted in U.S. patent application Ser. No. 08/646, 198 may be used as needed.

I. Vehicle Construction and Designs

Referring now to FIGS. 27A–31B, alternative vehicle shapes, designs and construction methods are disclosed. In particular, each vehicle car may include a nose section 1102, a middle car section 1104, a vehicle doorway 1106, back-to-back seats 1108, and either a low floor 1110 or a high floor 1112. If desired, a plurality of cars may be secured to form a train of cars having a front car 1114 and a rear car 1116.

Figure 27A:
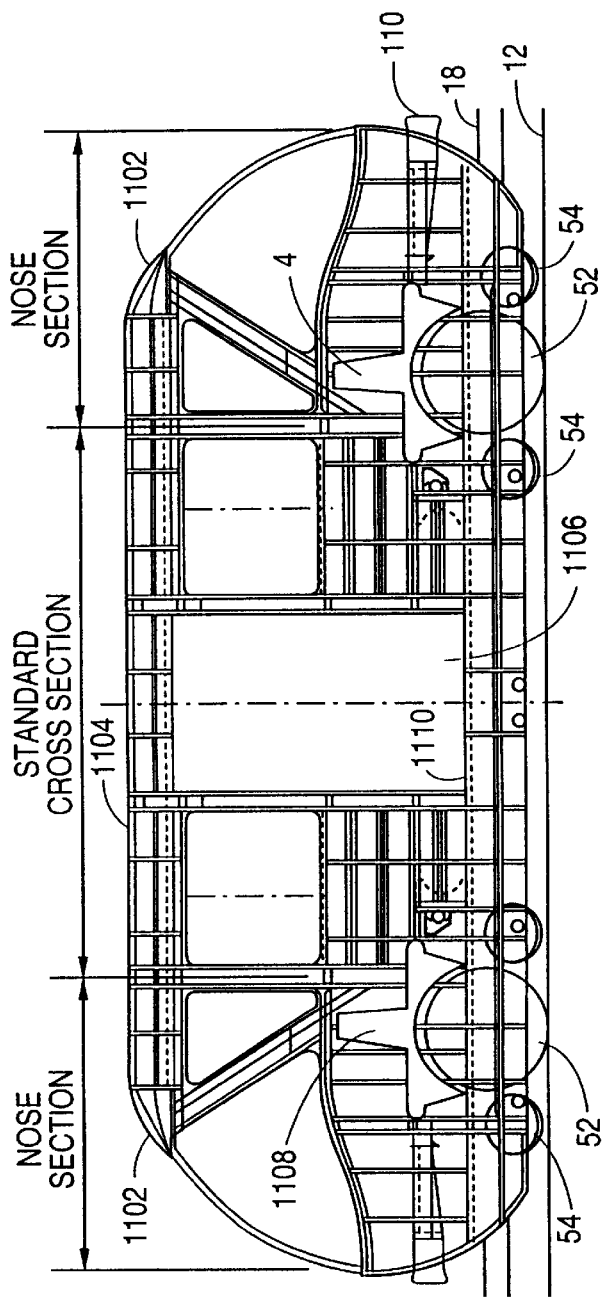
FIG. 27A is a side view of a vehicle in accordance with a preferred embodiment of the present invention having a single vehicle framed with aircraft aluminum and having a low floor.
Figure 27B:
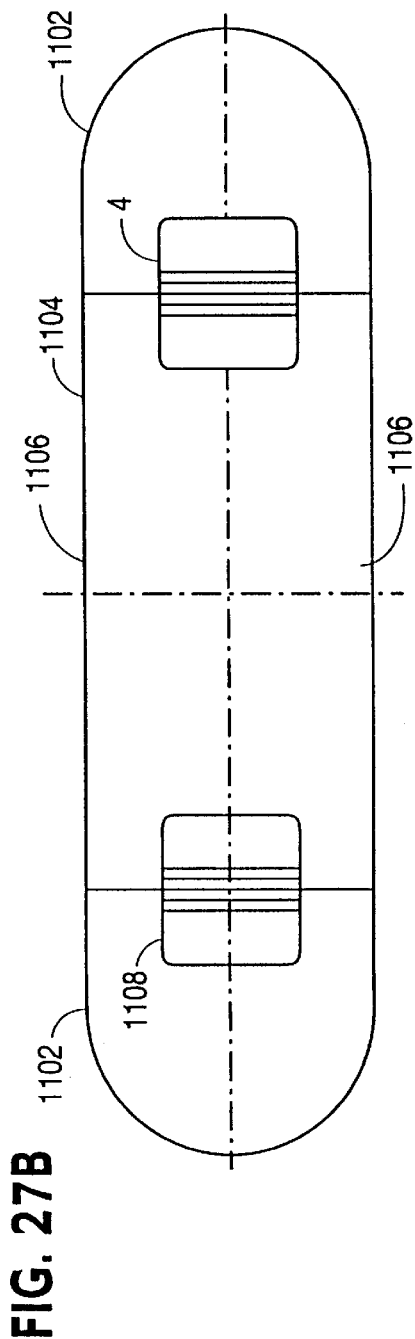
FIG. 27B is a top plan view of the vehicle of FIG. 27A.
Figure 30:
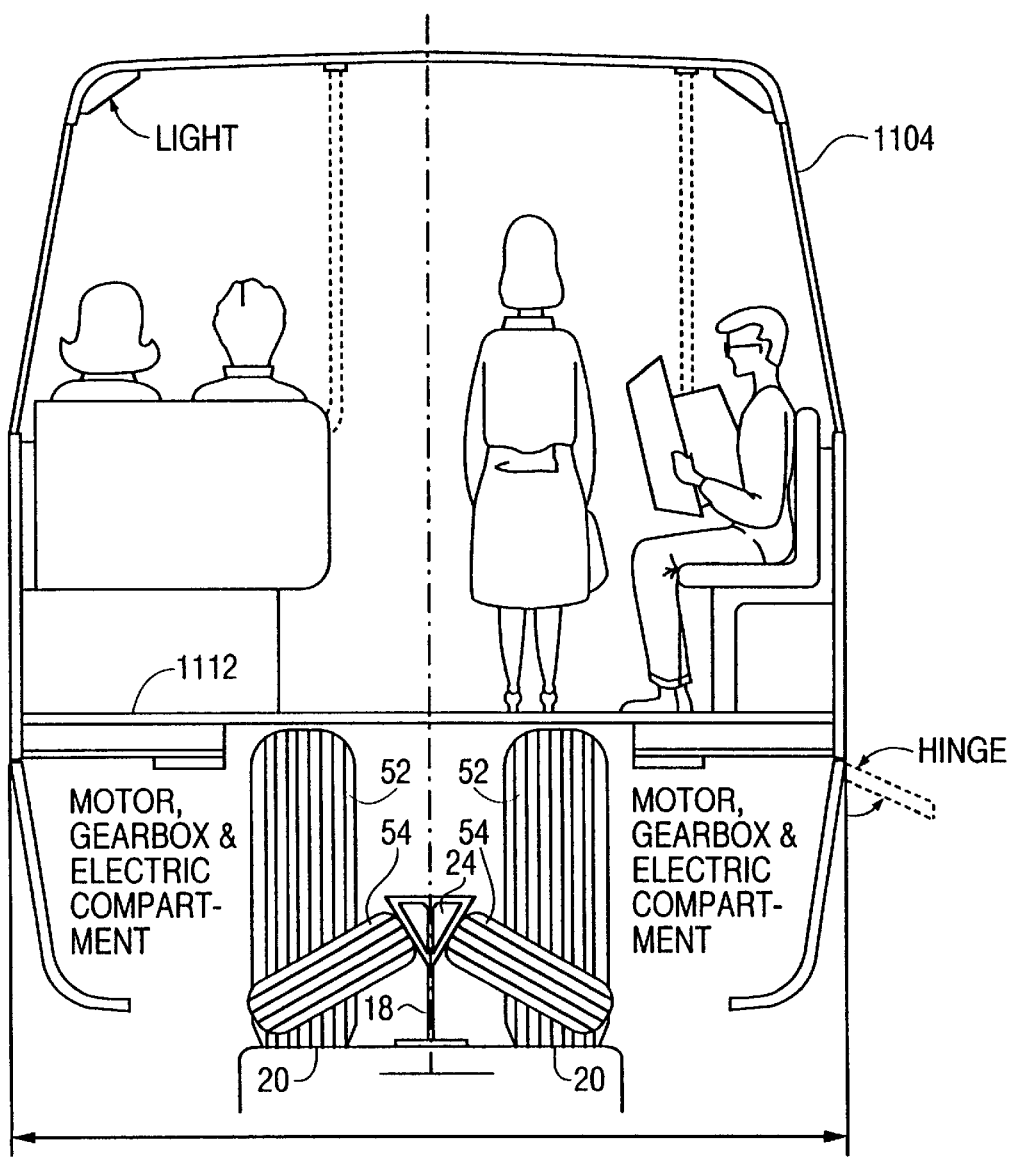
FIG. 30 is an enlarged cross-sectional plan view of taken along line 30—30 of FIG. 29B showing possible orientation of people and monorail components.

Referring now to FIGS. 27A and 27B, each vehicle car can be manufactured with prefabricated components including two nose sections 1102 secured to a central middle car section 1104. This vehicle features a low floor 1110, wherein the drive wheels extend above the vehicle floor in selected locations, and the remaining floor is below the top of the drive wheels. The areas where the tires protrude above the floor are covered with seats as shown. However, there is unobstructed floor space with passage on both sides of the tires, so passengers are free to walk from one end to the other end of the vehicle. The vehicle is preferably constructed with aircraft aluminum.

Referring now to FIGS. 28A, 28B, and 29B, a plurality of cars forming a train are disclosed. In particular, front car 1114 includes a nose section 1102 secured to a central middle car section 1104. Rear car 1116 includes a nose section 1102 secured to a central middle car section 1104. All middle cars include only a middle car section 1104, and the area between adjacent cars is open, permitting passengers to walk freely between them.

As best shown in FIGS. 28A, 28B, 29A, 29B, and 30, each car includes a high floor 1118, wherein the entire floor is positioned above the top of the drive wheels providing unobstructed floor space from end-to-end of the vehicle or a train of several vehicles coupled together. Each car is preferably constructed with aircraft aluminum.

A plurality of middle cars may be installed as needed to accommodate passenger demand. Similarly, train sizes (i.e. the length of the middle sections) may be adjusted to accommodate a desired passenger load.

Referring now to FIGS. 29A and 29B, the basic vehicle configuration as that shown in FIGS. 28A and B, respectively, is disclosed. However, the vehicle body is preferably constructed with composite materials.

Figure 31A:
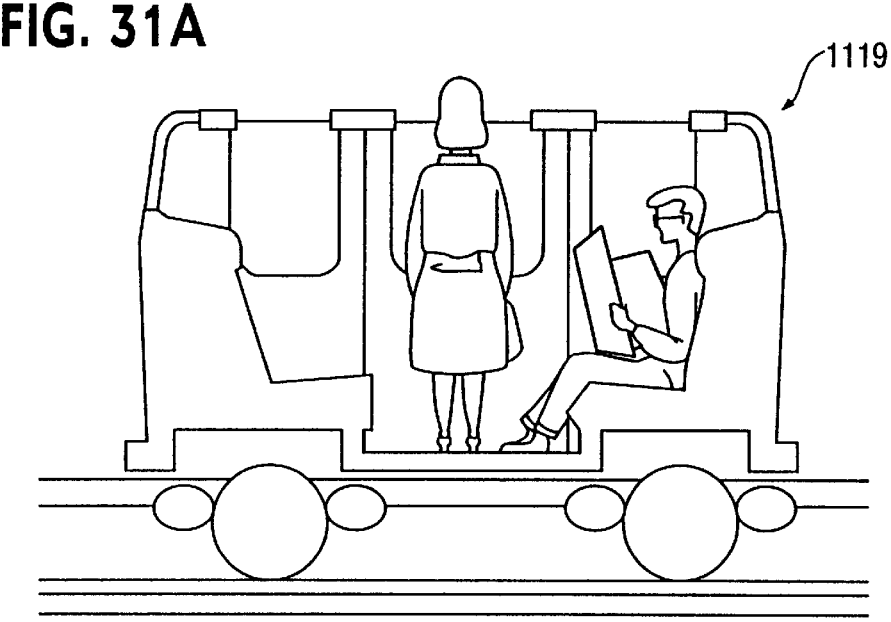
FIG. 31A is a side plan view of a vehicle in accordance with a preferred embodiment of the present invention having a low profile and adapted to seat 6 passengers and one wheel chair.
Figure 31B:
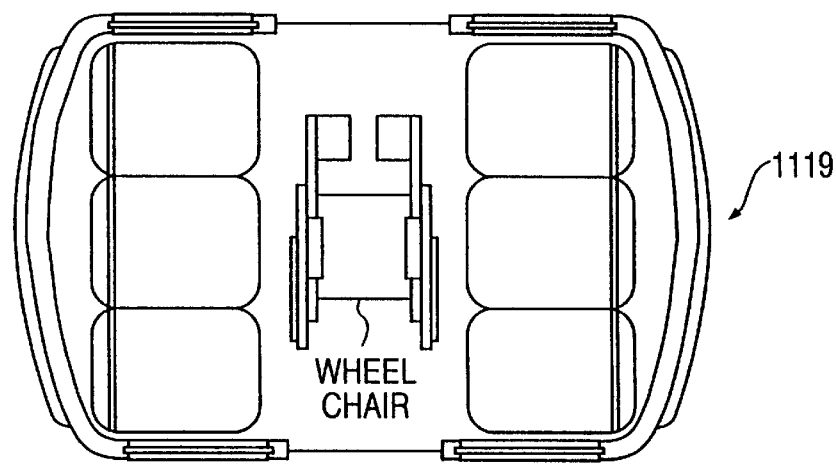
FIG. 31B is a top plan view of the vehicle of FIG. 31A.

A low profile Personal Rapid Transit (PRT) is disclosed in FIGS. 31A and 31B. This vehicle is sized and shaped to accommodate a small group of passengers, such as six passenger and one wheelchair. The overall height of the vehicle is less than the height of a typical passenger. A central sliding or overhead doorway on each side of the vehicle, and which extends across half of the cross-sectional area of the vehicle, allows passengers to stand-up when entering or exiting the vehicle.

In light of the wide variety or shapes and designs for the vehicle, all of which will operate on the guide way system of the present invention, the size and shape of vehicles running on the system may be modified throughout the day or season in response to passenger demand. Moreover, each car can be adapted to operate fully automatically without a driver. For example, automatic electronic control signals can be transmitted to each vehicle through inductive conduits mounted along the stabilizer guide rail, on top of the runway, or inside the beam way.

J. Improved Safety Features

Figure 32:
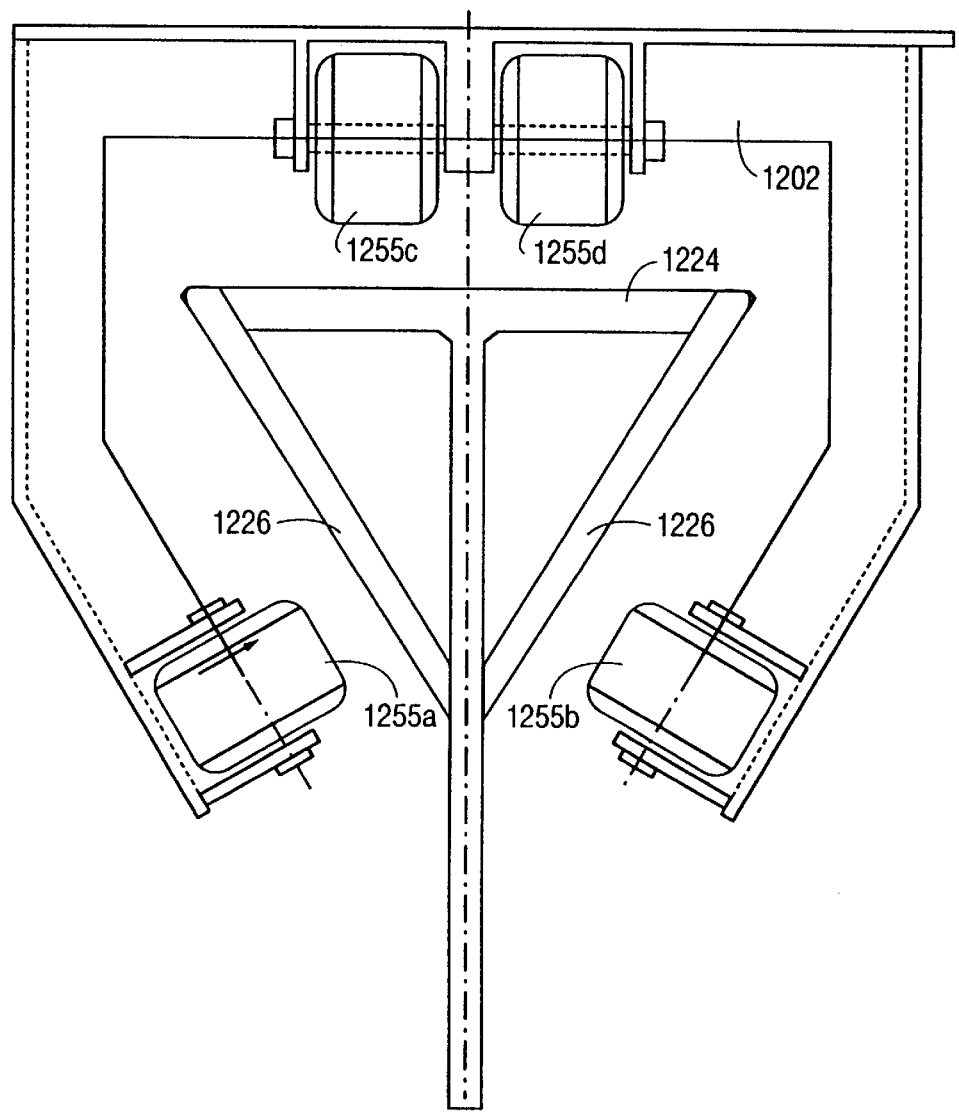
FIG. 32 an enlarged partial schematic sectional end view of an emergency guide wheel assembly showing possible orientation on a guide rail in accordance with a preferred embodiment of the present invention.

Referring now to FIG. 32, an emergency guide wheel arrangement is disclosed. In particular, a safety guide wheel frame 1202 nearly encircles the head 1224. Emergency guide wheels 1255 (here guide wheels 1255*a–b* shown) are rotatably mounted to the frame 1202 such that they engage the guide tracks 1226 of the head 1224 in the event of failure of any inflated tire in the vehicle. Additional emergency guide wheels 1255 (here guide wheels 1255*c–d* shown) are also rotatable mounted to the frame 1202 such that they engage the upper side of head 1224. The emergency guide wheels 1255 may be constructed of solid rubber, urethane, or other suitable, non-inflated, material.

In the event of a failure in any inflated rubber tires in the monorail system, such as in the drive wheels or stabilizer guide wheels, the emergency guide wheel arrangement, with its safety wheel frame 1202 enveloping the guide rail allows the emergency guide wheels 1255 to engage the guide rail, thereby reducing the likelihood of vehicle derailment. The frame 1202 may be attached to the bogie or the floor frame of the vehicle.

Referring to FIGS. 33A–33D, pneumatic tires such as those used as drive wheels and guide wheels can be adapted to include internal central support structures that maintain integrity of the tire in the event of inadvertent lose of pneumatic tire pressure. One known manufacturer of such tires is Hutchinson Industries Inc. of Trenton, N.J., which markets such tires under the trademark "RUN-FLAT".

K. Improved Switching

Improved switching devices are disclosed in FIGS. 34–39. Referring specifically to FIGS. 34–38, a vehicle switch assembly is disclosed including a vehicle running path 13300, a stabilizer guide rail 13301, a lever arm assembly 13302, an on-line guide way 13303, an off-line guide way 13304, a side beam guide way 13305, a side beam or slab 13306, a contact side beam wheel 13308, a side rail wheel 13309, a wheel bogie frame 13310, a protected casing 13311 for the lever arm assembly 13302, a vehicle floor frame 13312, a vehicle 13313, a fixed pivot point 13314, an expandable piston 13315, and a widened entrance portion 13316 of the side beam guide rail 13305.

Figure 34:
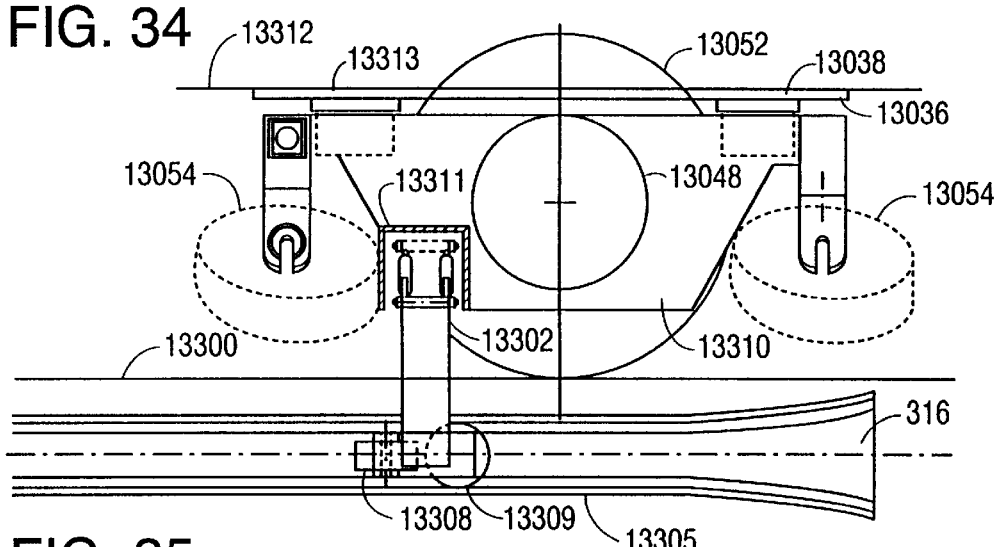
FIG. 34 is a partial side plan view of a vehicle on-board switch assembly in accordance with a preferred embodiment of the present invention.
Figure 35:
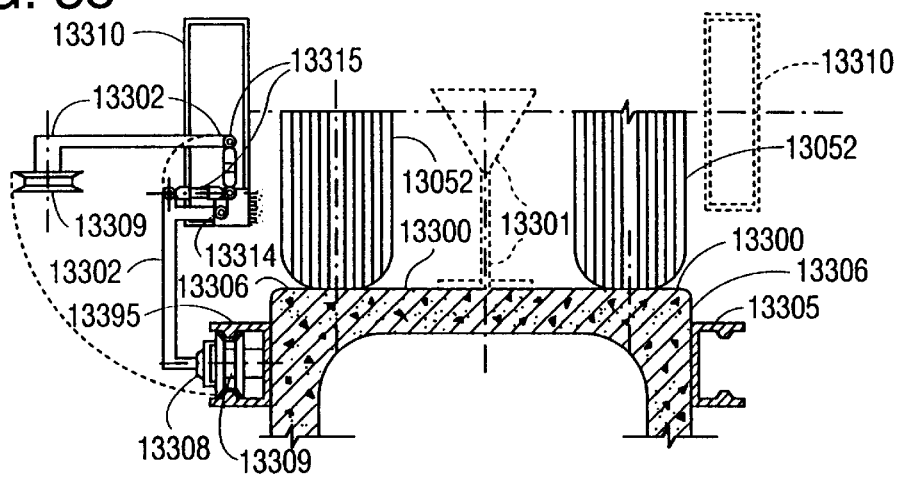
FIG. 35 is a schematic sectional plan view of the switch assembly of FIG. 34.
Figure 36:
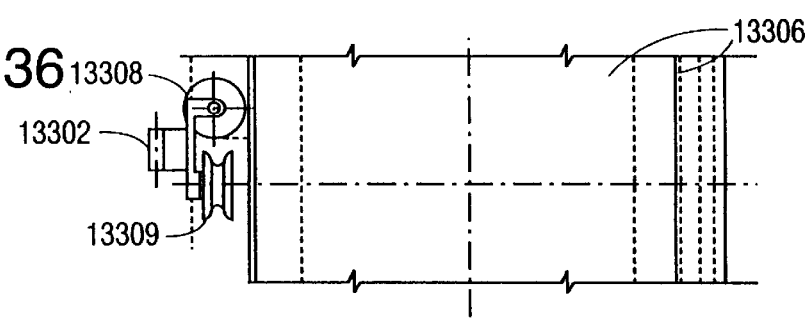
FIG. 36 is a partial top plan view of the switch assembly of FIG. 34.
Figure 37:
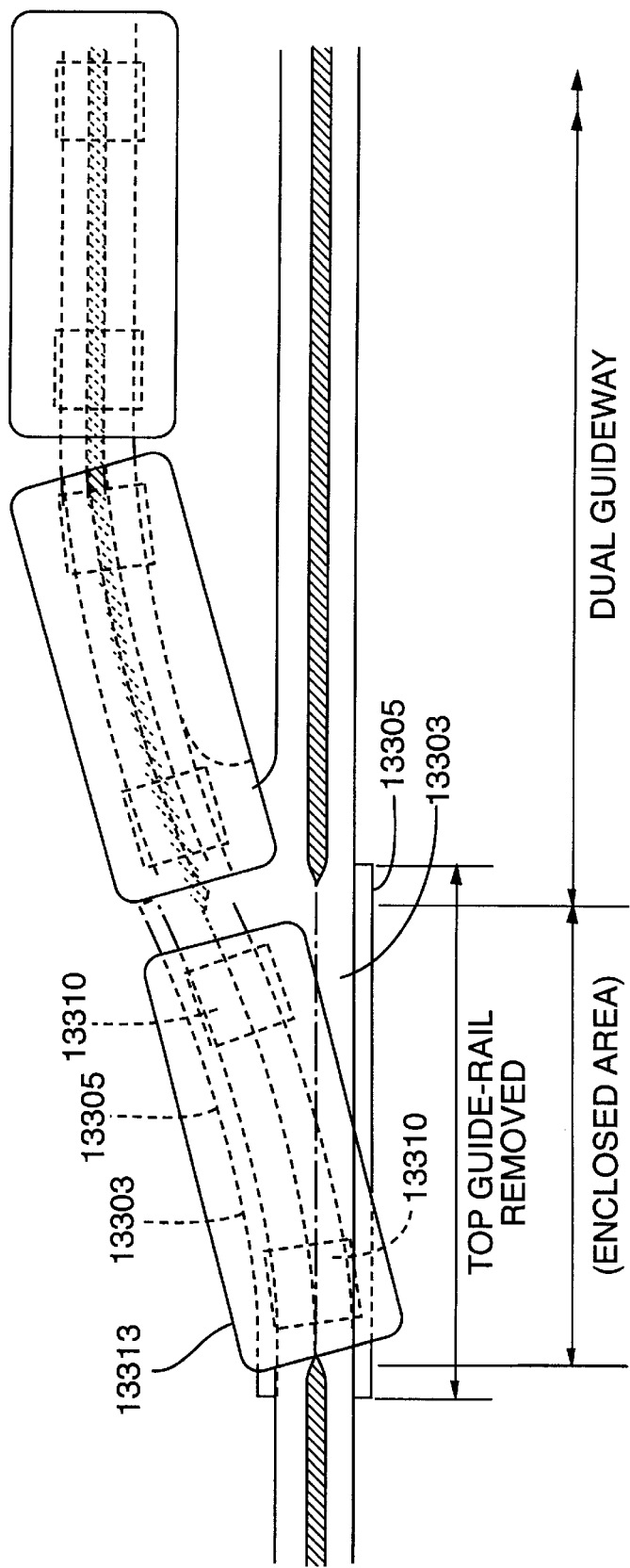
FIG. 37 is a schematic top plan view of a vehicle switch dispatch area in accordance with a preferred embodiment of the present invention.
Figure 38:
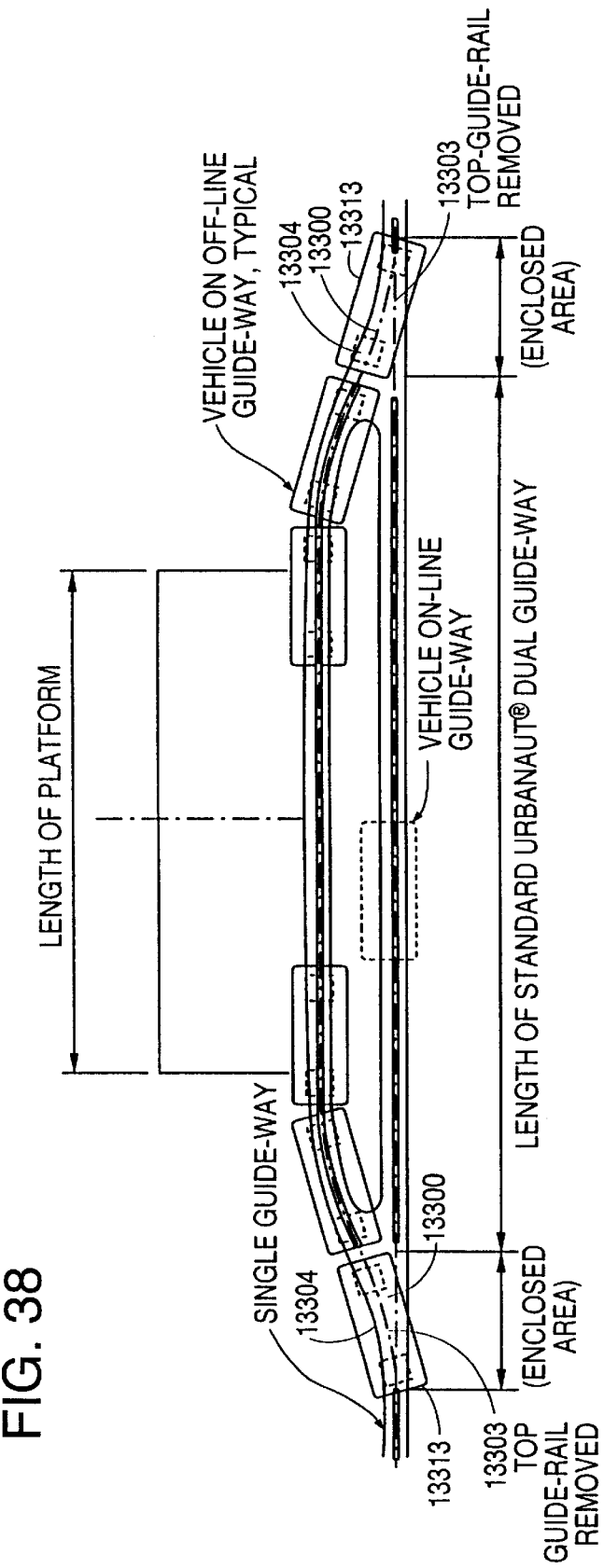
FIG. 38 is a schematic top plan view of a possible off-line station incorporating an on-board vehicle switch in accordance with a preferred embodiment of the present invention.

In particular and referring specifically to FIGS. 34–36, the improved vehicle switch assembly 13302, which is automatically controlled and operated on-board the vehicle or from a central vehicle control center is shown. The on-board switching involves removing a short length of the longitudinal stabilizer rail 13301 on the top of the runway 13300, where the vehicle is dispatched from one on-line guide way 13303 to another off-line guide way 13304. This section of the guide way has a smooth unobstructed surface area 13300 where the wheel bogie with the two guide wheels can be guided onto another guide way without any surface interference. The steering of the vehicle is accomplished by adding a side beam guide rail 13305 that is mounted to the outside of the beam way 13306 or a running slab at surface.

A lever arm assembly 13302 is in a protected casing 13311 that is confined within or below the floor frame 13312 of the vehicle 13313 when not activated. When activated to switch the vehicle from one guide way 13303 to another 13304, the lever arm assembly 13302 is pivoted about a fixed point 13314, by means of a piston 13315 that expands and forces the lever arm 13302 to rotate about the pivot point 13314 approximately 90 degrees. In this position, the wheel 13306 makes contact with the outside of the beam way or slab, and guides the rail wheel 13309 into the widened entrance 13316 of the guide rail 13305. With the stabilizer rail 13301 removed, the vehicle now is guided along the surface from guide way 13303 to guide way 13304 by the vehicle switching assembly 13302.

When the wheel bogie has passed though the intersection of the two guide ways on-line guide way 13303, and off-line guide way 13304, the normal stabilizer grail 13301 appears and will take over the guidance of the vehicle. At this point, the guide rail along the side of the beam way 13305 is terminated, and the lever assembly 13302 is deactivated and automatically rotated 90 degrees back into the casing 13311 under the vehicle floor.

The on-board switching has a several application in the present monorail system. For example, in the maintenance yard, vehicles can be guided form one guide way into a number of service and docking bays by use of the on-board switch. When applying an off-line station as shown in FIG.

38, a train of vehicles can be loaded on an off-line guide way while another train remains able to pass by on an online guide way. Another application permits cross-switching vehicles at the same level from one main guide way to anther and vice-versa.

The despatch area for the on-board switching is a rather short distance of approximately the length of the vehicle. For extra security against, for example, extreme side winds on the vehicle, the dispatch area can be protected and enclosed by, for example, a transparent bubble shape enclosure.

Figure 39:
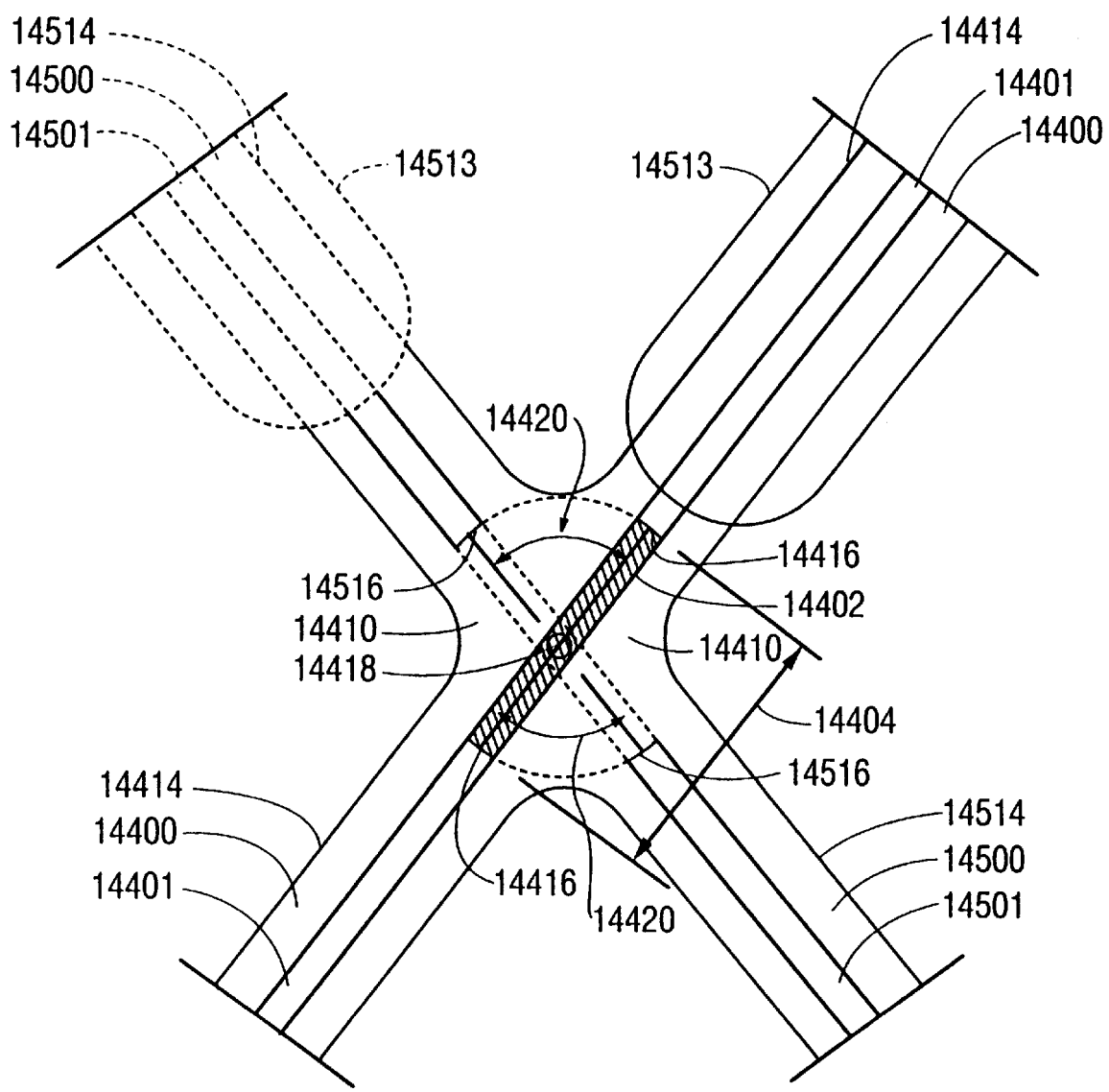
FIG. 39 is an alternative preferred vehicle switching device in accordance with a preferred embodiment of the present invention.

Referring now to FIG. 39, an alternative vehicle rail switch is disclosed. In particular, this switch includes crank motor 14340 as disclosed in U.S. patent application Ser. No. 08/646,198, runway surface 14400 for a first vehicle, stabilizer rail 14401 for the first vehicle, rotational non-flexible switch 14402, length of switch 14404, intersection 14410, first vehicle 14413, guide way for first vehicle 14414, intersection point 14415, locked position 14416 of switch for first vehicle, central pivot point 14418 for switch, angle 14420 of switch rotation, runway surface 14500 for second vehicle, stabilizer rail 14501 for second vehicle, second vehicle 14513, guide way for second vehicle 14514, and locked position 14516 of switch for second vehicle.

In particular, the alternative switch in FIG. 39 provides a short rotational nonflexible switch 14402 of a length 14404 that allows a first vehicle 14413 and a second vehicle 14513 from two separate monorail guide ways 14414 and 14514, at the same elevation to cross each other at an intersection 14410. This is accomplished by rotation a short segment of one of the stabilizer guide rails 14401 and 14501 about a central pivoting point 14418 on the top surface of the level intersection area 14410.

As shown in FIG. 39, the first vehicle 14413 is guided along the stabilizer 14401 through the intersection 14410 with the switch 14402 in position 14416, which is aligned with stabilizer 14401. When the second vehicle 14513 approaches the intersection 14410, the switch 14402 rotates counterclockwise about the pivot point 14418 at an angle 14420 and aligns the switch 14402 with the stabilizer guide rail 14501 in the second locked position 14516.

The switch is rotated back and forth at an angle 14420 between the 2 positions 14416 and 14516 by means of a crank motor 14340, lever arm 14338, guide slot 14332 or similar device as illustrated in U.S. patent application Ser. No. 08/646,198.

The switch is automatically operated from a central monorail control station. Moreover, the switch may be readily modified to include switching between three or more intersecting vehicle run ways.

L. Prefabricated Dual Guide Way

In addition to the prefabricated guide ways support structures disclosed in pending provisional U.S. patent application No. 60/081,337, FIGS. 9A–10B, an additional support structure is disclosed in FIGS. 40A–B with like elements having like reference numbers. This support structure features a pipe column serving as the vertical column 61, and a t-shaped cantilever support serves as the guide way support 71. As with all previously disclosed support structures, this support structure can be prefabricated off-site in portable light-weight components. Here the support structure includes six components. These components may be easily transported to the assembly site and quickly installed.

Having described and illustrated the principles of the invention with reference to preferred embodiments thereof, it should be apparent that these embodiments can be modified in arrangement and detail without departing from the principles of the invention. In view of the wide variety of embodiments to which the principles of the invention can be applied, it should be apparent that the detailed embodiments are illustrative only and should not be taken as limiting the scope of the invention. Rather, the claimed invention includes all such modifications as may come within the scope of the following claims and equivalents thereto.

Thus the monorail system of the present invention has great flexibility in application. It can be used in a city environment where speed is reduced due to short distances between numerous stops or in rural areas where there are infrequent stops and speed may be as high as 300 miles per hour using the Maglev Technology embodiment. In addition, the small size of the monorail system of the present invention enables locating the monorail in a wide variety of urban and rural locations thereby reducing the physical and aesthetic impact on the environment.

Those skilled in the art will realize that the monorail system of the present invention will be one half to one third the cost of conventional elevated transportation systems. The reasons for the reduced cost is the small size of the components, reduced quantity of construction materials, and components can be mass produced in a factory and assembled in less time on site.

The invention may be embodied in other specific forms without departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A monorail system comprising:
    a support having an essentially longitudinal planar top surface, said top surface having a top surface width;
    a longitudinal stabilizer guide rail having a vertical web supporting a head portion having two stabilizer guide tracks, said stabilizer guide rail mounted parallel to and on top of said planar top surface and dividing said planar top surface into two parallel vehicle running paths;
    at least one propelled vehicle, received in said parallel vehicle running paths, said vehicle having a vehicle width, a vehicle body and a bogie in connection with said vehicle running paths and said stabilizer guide rail, said bogie being able to rotate independently about a pivot point between said vehicle body and said bogie and having at least one drive wheel for engaging at least one of said vehicle running paths;
    said top surface width not more than half of said vehicle width;
    a motor operably secured to said bogie directly driving said drive wheel; and, wherein said drive wheel includes a hub, and said motor is operably secured within said hub.

2. The monorail system of claim 1, further including a gear and brake assembly integral with said motor in said hub.

3. A monorail system of comprising:
    a support having an essentially longitudinal planar top surface, said top surface having a top surface width;
    a longitudinal stabilizer guide rail having a vertical web supporting a head portion having two stabilizer guide tracks, said stabilizer guide rail mounted parallel to and on top of said planar top surface and dividing said planar top surface into two parallel vehicle running paths;

at least one propelled vehicle, received in said parallel vehicle running paths, said vehicle having a vehicle width, a vehicle body and a bogie in connection with said vehicle running paths and said stabilizer guide rail, said bogie being able to rotate independently about a pivot point between said vehicle body and said bogie and having at least one drive wheel for engaging at least one of said vehicle running paths;

said top surface width not more than half of said vehicle width;

a motor operably secured to said bogie directly driving said drive wheel; and, wherein said vehicle includes a turntable mount and said bogie includes:
 a turntable supporting said drive wheel and said motor;
 a bearing ring rigidly secured to said pivot point for transferring lateral forces from said vehicle to said bogie; and
 wherein said bearing ring is pivotally secured to said turntable mount.

4. A monorail system of comprising:

a support having an essentially longitudinal planar top surface, said top surface having a top surface width;

a longitudinal stabilizer guide rail having a vertical web supporting a head portion having two stabilizer guide tracks, said stabilizer guide rail mounted parallel to and on top of said planar top surface and dividing said planar top surface into two parallel vehicle running paths;

at least one propelled vehicle, received in said parallel vehicle running paths, said vehicle having a vehicle width, a vehicle body and a bogie in connection with said vehicle running paths and said stabilizer guide rail, said bogie being able to rotate independently about a pivot point between said vehicle body and said bogie and having at least one drive wheel for engaging at least one of said vehicle running paths;

said top surface width not more than half of said vehicle width;

a motor operably secured to said bogie directly driving said drive wheel; and, wherein said bogie includes a turntable having a periphery and encircling said drive wheel; and said turntable is slidably secured to said vehicle at said periphery.

5. A monorail system comprising:

a support having an essentially longitudinal planar top surface;

a longitudinal stabilizer guide rail having a vertical web supporting a head portion having two stabilizer guide tracks, said stabilizer guide rail mounted parallel to and on top of said planar top surface and dividing said planar top surface into two parallel vehicle running paths;

at least one propelled vehicle, received in said parallel vehicle running paths, said vehicle having a vehicle width, a vehicle body and a bogie in connection with said vehicle running paths and said stabilizer guide rail, said bogie being able to rotate independently about a pivot point between said vehicle body and said bogie and having at least one drive wheel for engaging at least one of said vehicle running paths; and a direct-drive motor operably secured to said bogie directly driving said drive wheel.

6. The monorail system of claim 5, wherein said longitudinal stabilizer guide rail is an I-beam.

7. The monorail system of claim 5, further including a plurality of conductive contact rails mounted to said guide rail running parallel to teach other and to said stabilizer guide rail; and
 at least one current collector mounted to the vehicle and having at least one collector head in electrical communication with said contact rails such that electrical power is transmitted though the contact rails to the vehicle.

8. The monorail system of claim 7, wherein said contact rails are mounted on top of said guide rail.

9. The monorail system of claim 7, wherein guide rail includes an I-beam having an upper flange and a lower flange, said upper flange forms said head portion, and said contact rails are mounted to said lower flange.

10. The monorail system of claim 5, wherein said guide rail is heated.

11. The monorail system of claim 5, wherein said running paths are heated.

12. The monorail system of claim 5, wherein an air cushion supports said vehicle above said bogie.

13. The monorail system of claim 5, wherein said drive wheel has an upper surface and said vehicle includes a horizontal floor positioned below said upper surface of said drive wheel.

14. The monorail system of claim 5, wherein said drive wheel has an upper surface and said vehicle includes a horizontal floor positioned above said upper surface of said drive wheel.

15. The monorail system of claim 5, further including:
 a safety guide wheel frame substantially encircling said head portion; and
 emergency guide wheels operably secured to said safety guide wheel frame and engaging said head portion.

16. The monorail system of claim 5, further including
 an arm having two opposite ends, said arm secured to said bogie at one end and having a switching wheel pivotally secured at its opposite end;
 a side beam rail secured to said support and running substantially parallel to said support for engaging said switching wheel such that the vehicle remains on the guideway and follows said running paths.

17. The monorail system of claim 5, further including:
 a plurality of planar top surfaces, each having said longitudinal stabilizer guide rail having a vertical web supporting a head portion having two stabilizer guide tracks, said stabilizer guide rails mounted parallel to and on top of said their respective planar top surfaces and dividing said planar top surfaces into two parallel vehicle running paths;
 said top surfaces intersecting at a point; and
 a rotating portion of said stabilizer guide rail pivotally secured to said support at said point such that it may align with said stabilizer guide rails across said point to permit said vehicle to cross the point.

* * * * *